United States Patent
Bang et al.

(10) Patent No.: US 12,170,962 B2
(45) Date of Patent: Dec. 17, 2024

(54) METHOD AND APPARATUS FOR TRANSMITTING OR RECEIVING INFORMATION RELATING TO LINK IN WIRELESS LAN SYSTEM

(71) Applicant: LG ELECTRONICS INC., Seoul (KR)

(72) Inventors: Saehee Bang, Seoul (KR); Jeongki Kim, Seoul (KR); Jinsoo Choi, Seoul (KR); Suhwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 332 days.

(21) Appl. No.: 17/615,305

(22) PCT Filed: Apr. 24, 2020

(86) PCT No.: PCT/KR2020/005431
§ 371 (c)(1),
(2) Date: Nov. 30, 2021

(87) PCT Pub. No.: WO2020/246708
PCT Pub. Date: Dec. 10, 2020

(65) Prior Publication Data
US 2022/0225236 A1    Jul. 14, 2022

(30) Foreign Application Priority Data
Jun. 3, 2019  (KR) .......................... 10-2019-0065546

(51) Int. Cl.
*H04W 52/02*   (2009.01)
*H04W 84/12*   (2009.01)

(52) U.S. Cl.
CPC ........ *H04W 52/0248* (2013.01); *H04W 84/12* (2013.01)

(58) Field of Classification Search
CPC . H04W 52/0248; H04W 84/12; H04W 52/02; H04W 72/04; Y02D 30/70
(Continued)

(56) References Cited

U.S. PATENT DOCUMENTS 11,432,300 B2 * 8/2022 Wang .................. H04W 72/542
11,503,539 B2 * 11/2022 Kim ....................... H04B 1/005
(Continued)

FOREIGN PATENT DOCUMENTS

KR    1020150069406    6/2015

OTHER PUBLICATIONS

Asterjadhi, Alfred et al., MAC-CR-Broadcast TWT, IEEE P802.11 Wireless LANs, doc; IEEE 802.11-19/0724r3, May 15, 2019, see section 26.8.3.3.

*Primary Examiner* — Robert J Lopata
(74) *Attorney, Agent, or Firm* — BRYAN CAVE LEIGHTON PAISNER LLP

(57) ABSTRACT

A method performed by a first STA in a wireless local area network (WLAN) according to various embodiments may comprise transmitting or receiving a TWT setup request message and a TWT setup response message. The first STA may perform a TWT operation on the basis of the TWT setup request message and the TWT setup response message. The TWT setup request message and the TWT setup response message may be transmitted or received through a first link included in multiple links. The first STA may set the first link to be in an awake state in order to perform the TWT operation through the first link.

12 Claims, 33 Drawing Sheets

(a)

(b)

(58) Field of Classification Search
USPC .......................................................... 370/329
See application file for complete search history.

(56) References Cited

U.S. PATENT DOCUMENTS

| | | |
|---|---|---|
| 2018/0092039 A1 | 3/2018 | Cariou et al. |
| 2018/0132175 A1 | 5/2018 | Choi et al. |
| 2018/0206174 A1 | 7/2018 | Zhou et al. |
| 2020/0163141 A1* | 5/2020 | Hsu .................. H04W 52/0209 |
| 2021/0058862 A1* | 2/2021 | Choo ................ H04W 52/0216 |
| 2021/0329721 A1* | 10/2021 | Kim ..................... H04W 76/15 |

* cited by examiner

FIG. 1
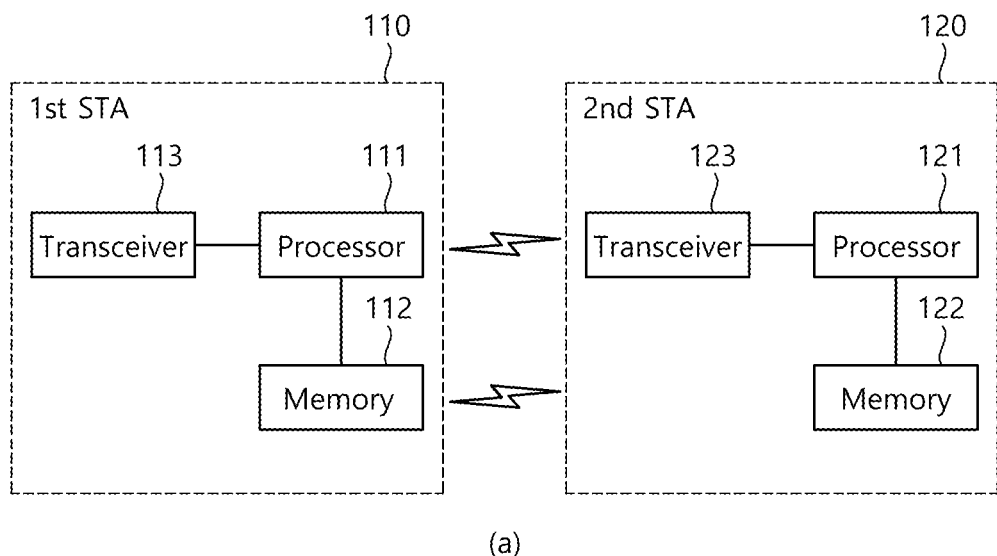
(a)
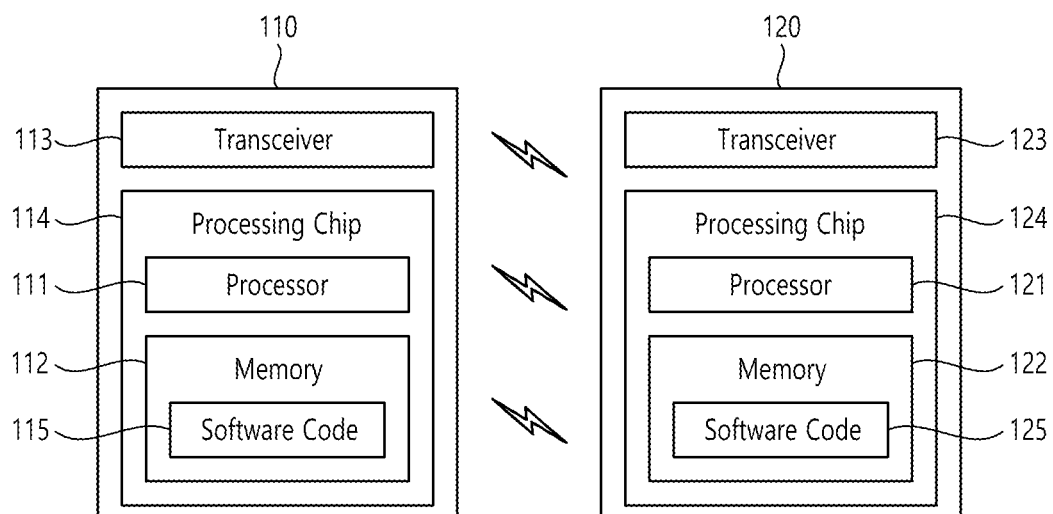
(b)

FIG. 2
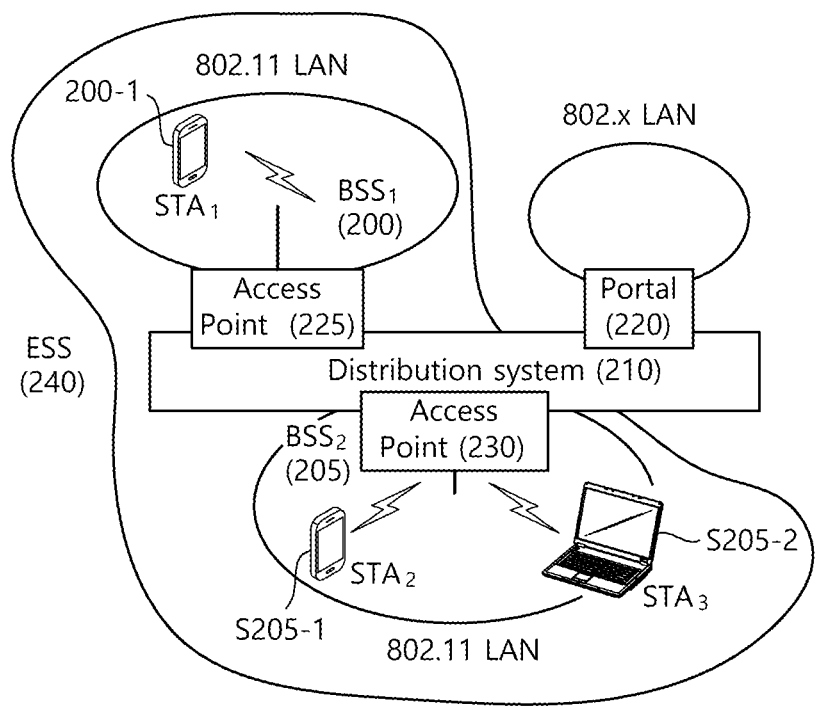
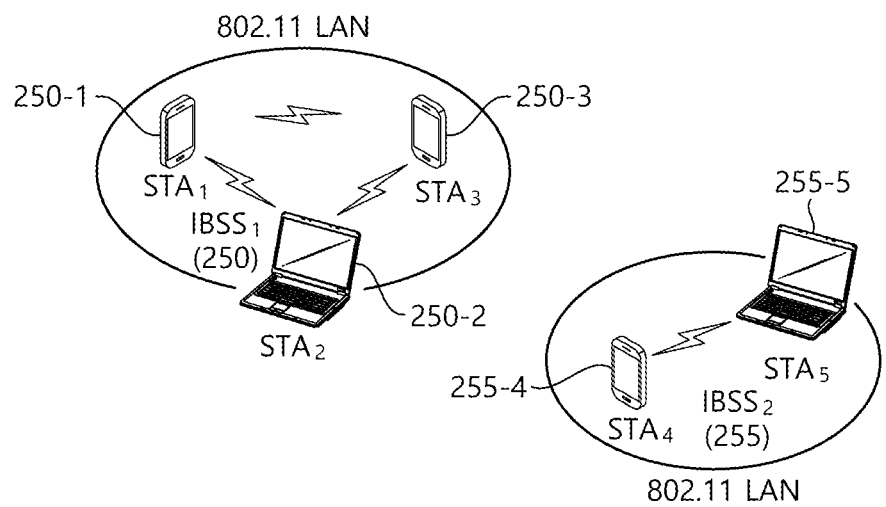

FIG. 4
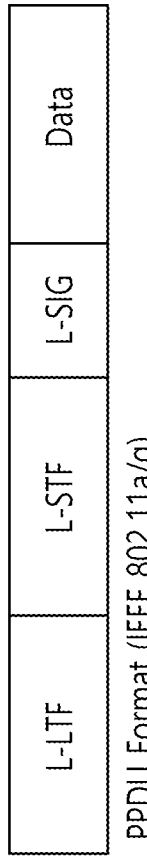
PPDU Format (IEEE 802.11a/g)
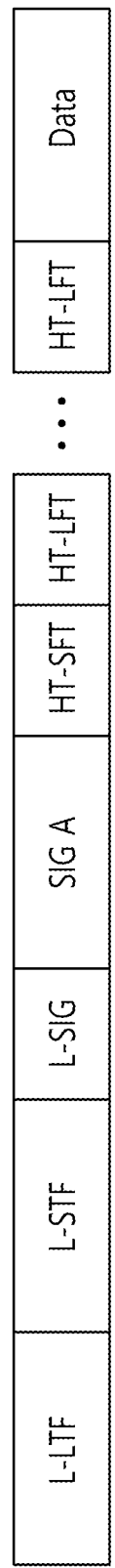
HT PPDU Format (IEEE 802.11n)
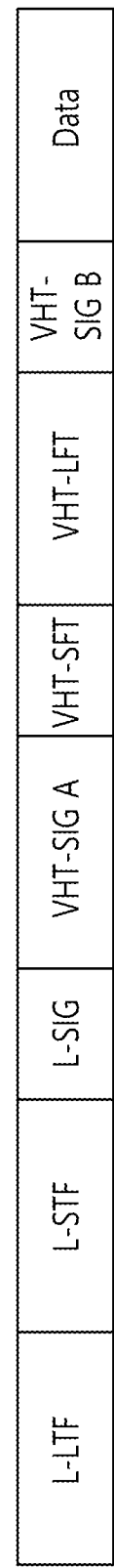
VHT PPDU Format (IEEE 802.11ac)
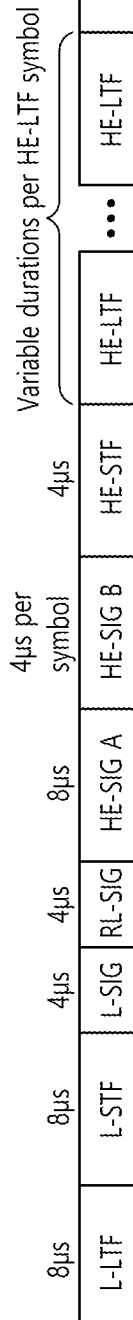

FIG. 18

FIG. 21
Channel Band1 (160MHz) 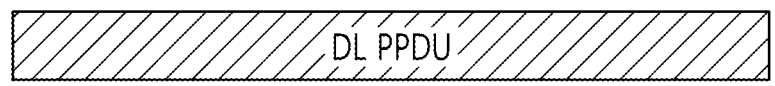
Channel Band2 (160/20MHz) 

FIG. 22
Channel Band 1 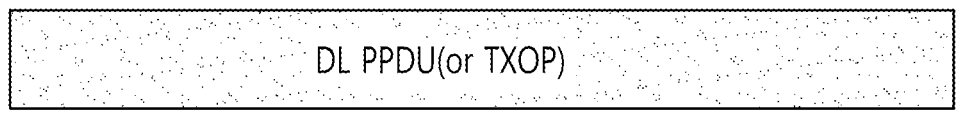
Channel Band 2 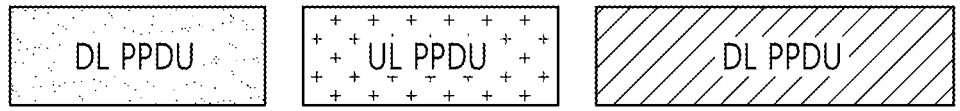

FIG. 27

| B0 | B1 | B2    B3 | B4    B7 |
|---|---|---|---|
| NDP Paging Indicator | Responder PM Mode | Negotiation Type | Reserved |

Bits :    1    1    2    4

METHOD AND APPARATUS FOR TRANSMITTING OR RECEIVING INFORMATION RELATING TO LINK IN WIRELESS LAN SYSTEM

This application is the National Stage filing under 35 U.S.C. 371 of International Application No. PCT/KR2020/005431 filed on Apr. 24, 2020, which claims priority to Korean Patent Application No. 10-2019-0065546 filed on Jun. 3, 2019, the contents of which are all hereby incorporated by reference herein in their entirety.

TECHNICAL FIELD

The present specification relates to a technique for transmitting and receiving data in wireless communication, and more particularly, to a method and apparatus for transmitting and receiving information related to a link for performing communication in a wireless LAN system.

RELATED ART

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In addition, methods for reducing power consumption in a wireless local area network (WLAN) have been improved in various ways. For example, in the IEEE 802.11ah standard, a TWT (Target Wake Time) technique has been proposed. In addition, in the IEEE 802.11ax standard, TWT technology has been extended to Individual TWT or Broadcast TWT technology.

SUMMARY

A Station (STA) based on the existing IEEE 802.11 standard generally uses one channel to transmit one packet or frame. The existing STA did not need to transmit a signal through a plurality of channels. From the IEEE 802.11be standard, multi-link may be supported. When performing the TWT operation, the existing STA needs to perform the TWT operation only through one of the first link and the second link.

Accordingly, a method for transmitting and receiving a signal for performing a TWT operation through the first link and performing a TWT operation only through the first link may be required. In addition, while the TWT operation is performed through the first link, a method for changing the TWT operation to be performed using both the first link and the second link may be required.

A method performed by a first STA in a wireless local area network (WLAN) according to various embodiments of the present disclosure includes transmitting, to a second STA, a target wake time (TWT) setup request message, wherein the TWT setup request message includes information related to whether the first STA supports TWT operation in multi-link, receiving, from the second STA, a TWT setup response message, in response to the TWT setup request message, wherein the TWT setup response message includes information related to a link on which the TWT operation is performed by the first STA, and determining an operating state of the first STA based on the TWT setup response message.

According to an example according to the present specification, the first STA may transmit and receive a TWT setup request message and a TWT setup response message through a first link. The first STA may configure a TWT service period (SP) based on the TWT setup request message and the TWT setup response message. The first STA may set the first link to an awake state and maintain the second link in a doze state during the TWT SP. Therefore, according to the method for the TWT operation of the present specification, there is an effect that the TWT operation can be performed through one link in multiple links.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

FIG. 21 is an example of applying a flexible UL/DL scheme to a wireless LAN system.

FIG. 22 is an example in which DL or UL transmission is performed by a time division duplex (TDD) scheme in a multi-band (or multi-link) environment.

FIG. 27 shows an example of the Control field of the TWT element field.

DESCRIPTION OF EXEMPLARY EMBODIMENTS

Figure 3:
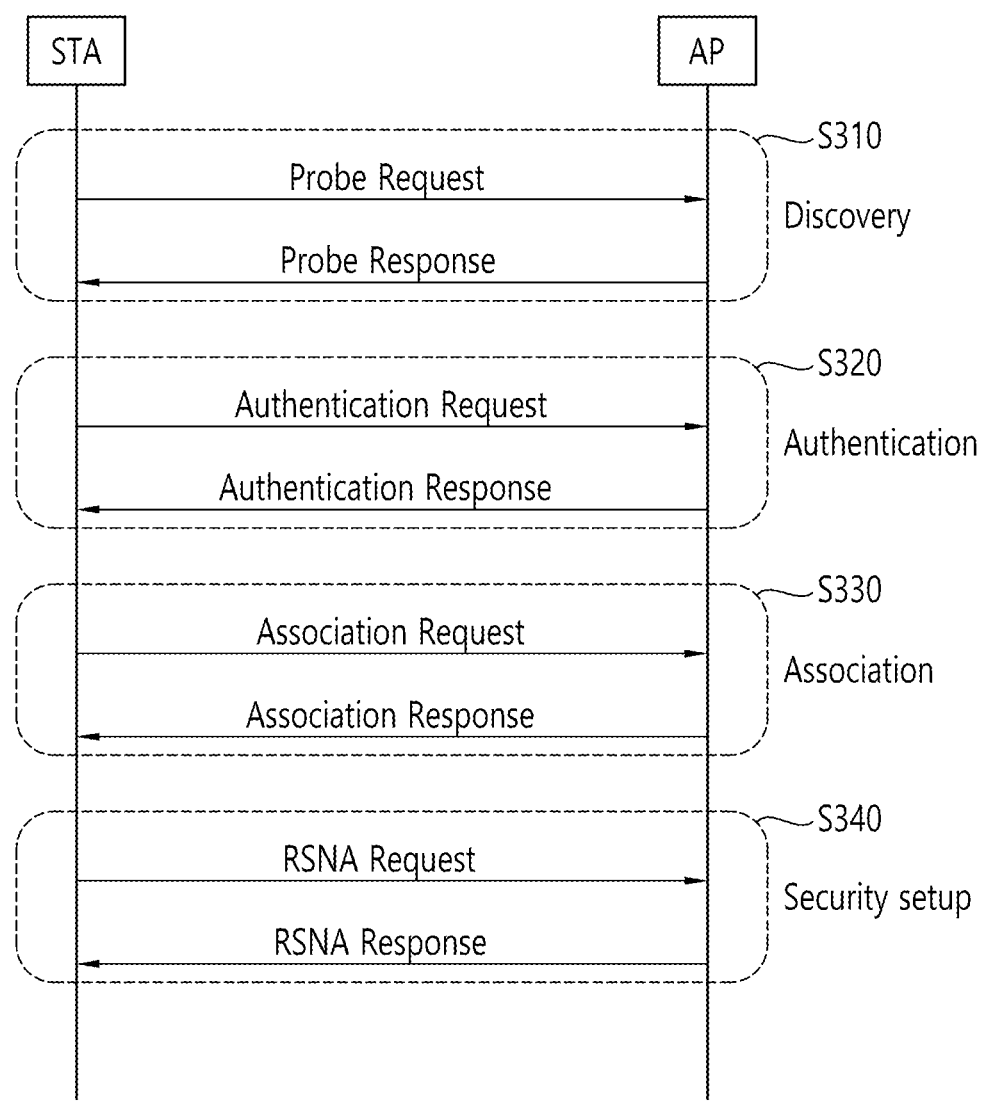
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

In the STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e g, channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
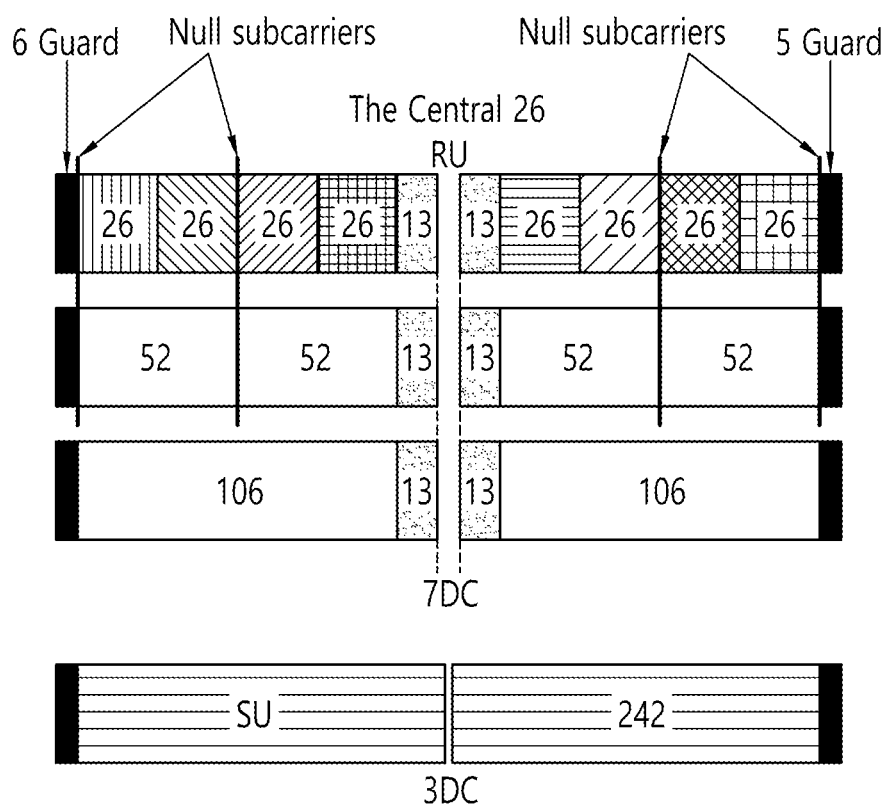
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
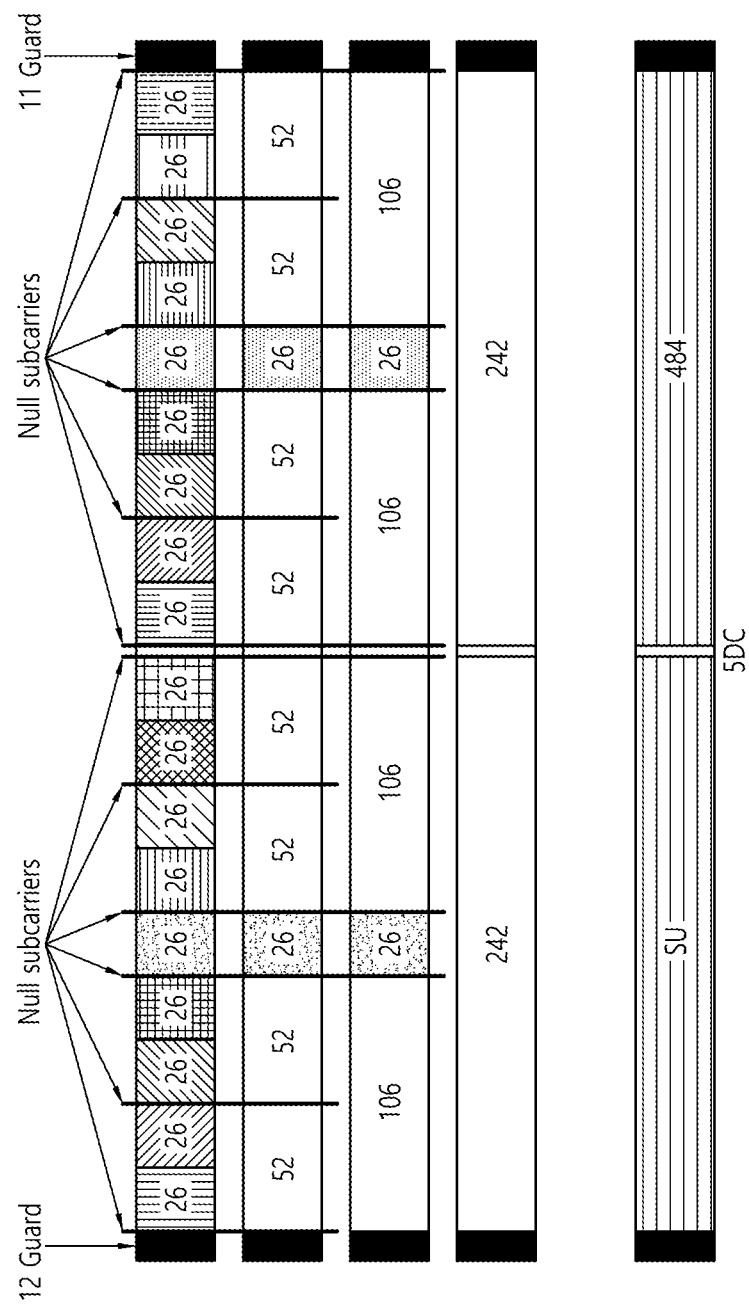
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
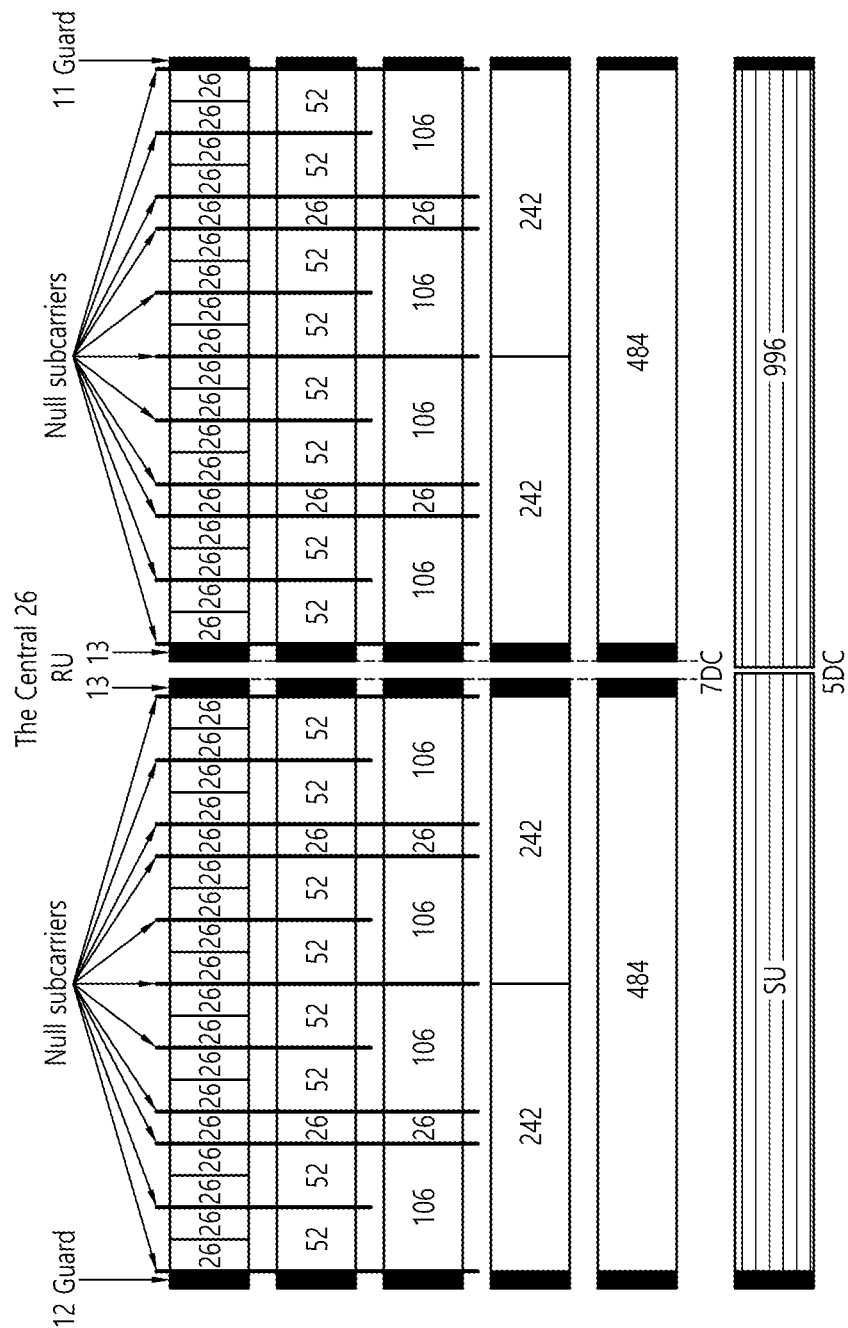
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
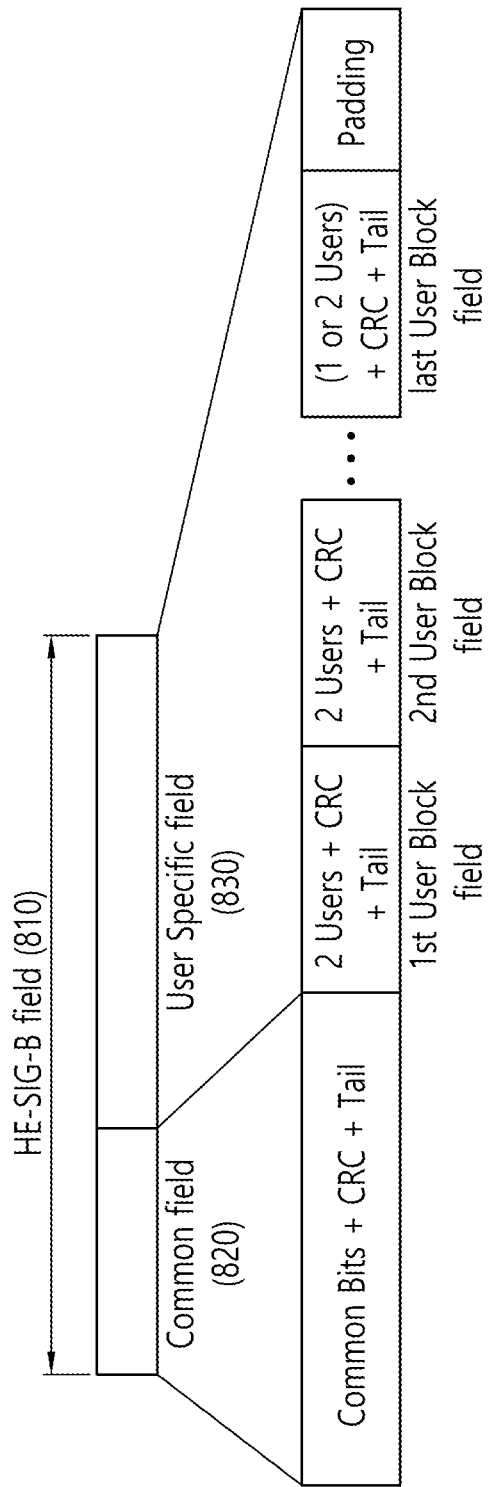
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-9 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
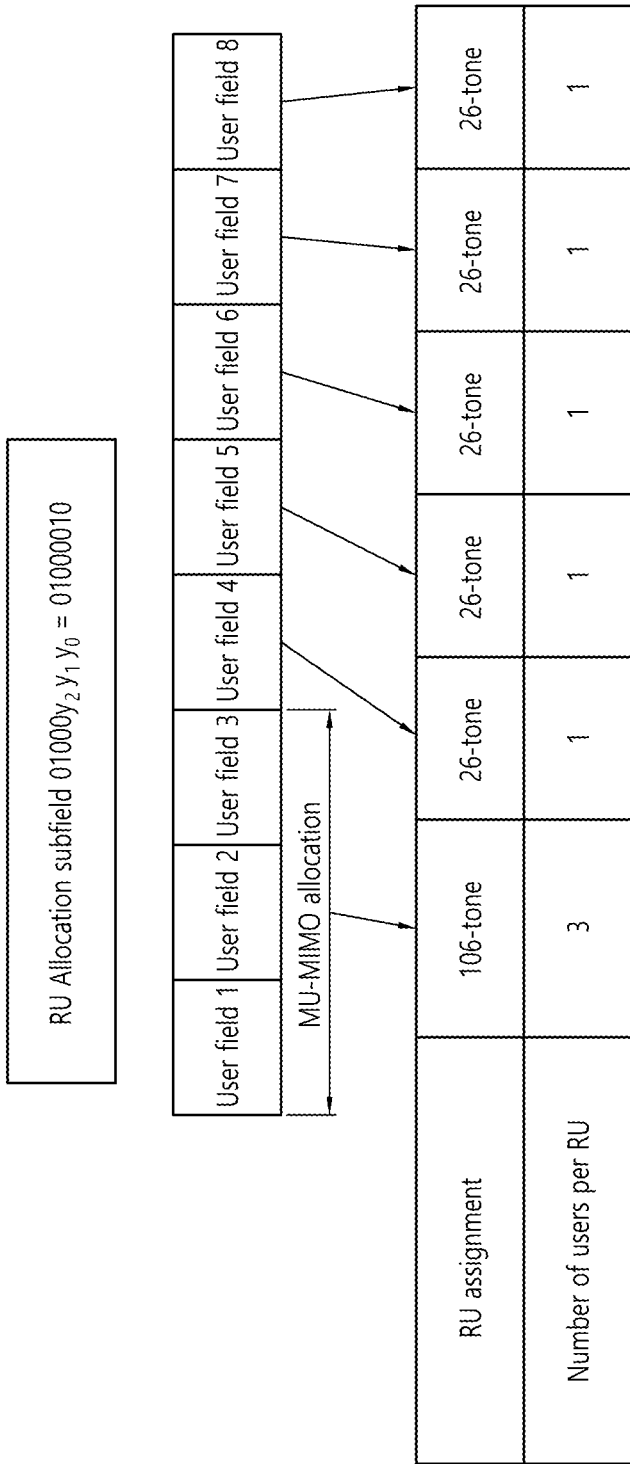
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
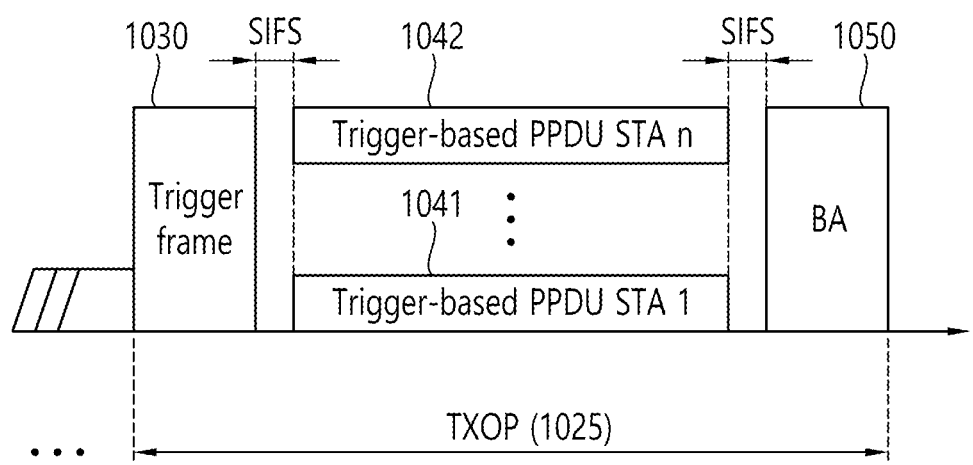
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
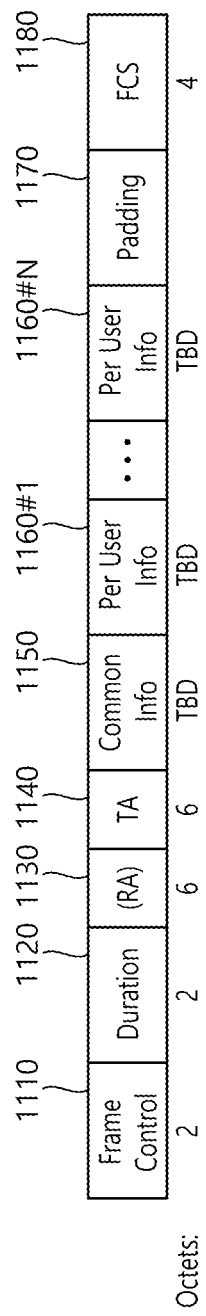
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
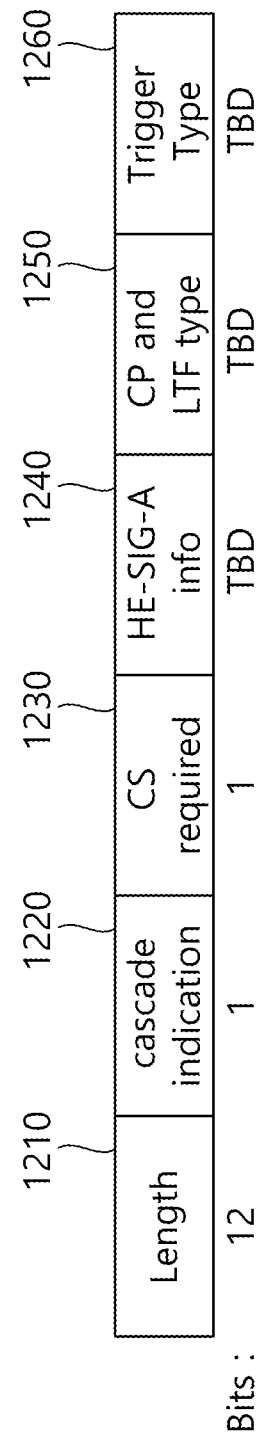
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
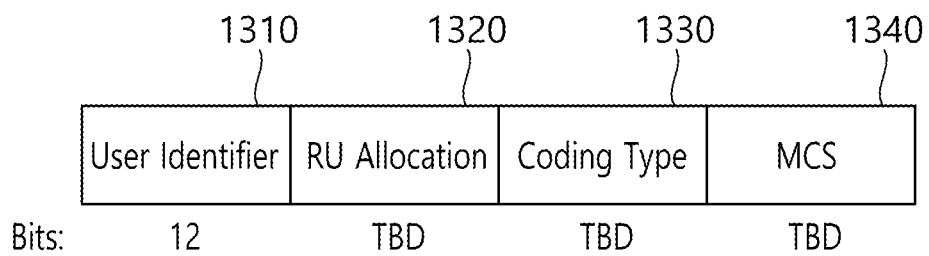
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
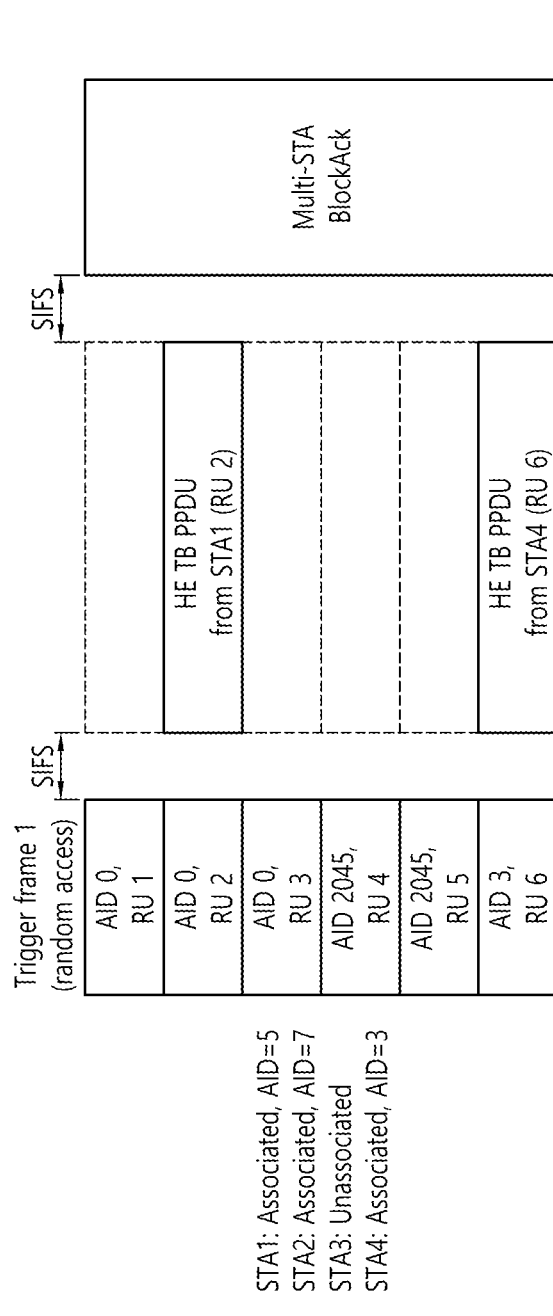
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
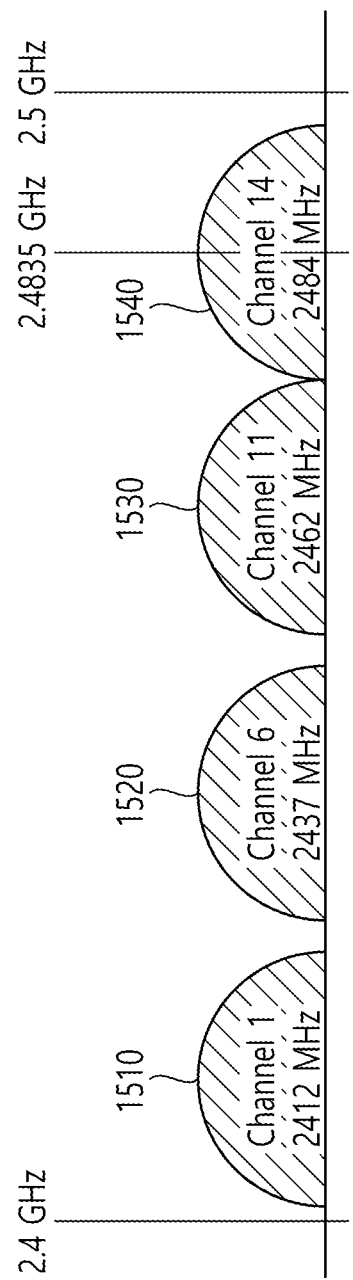
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
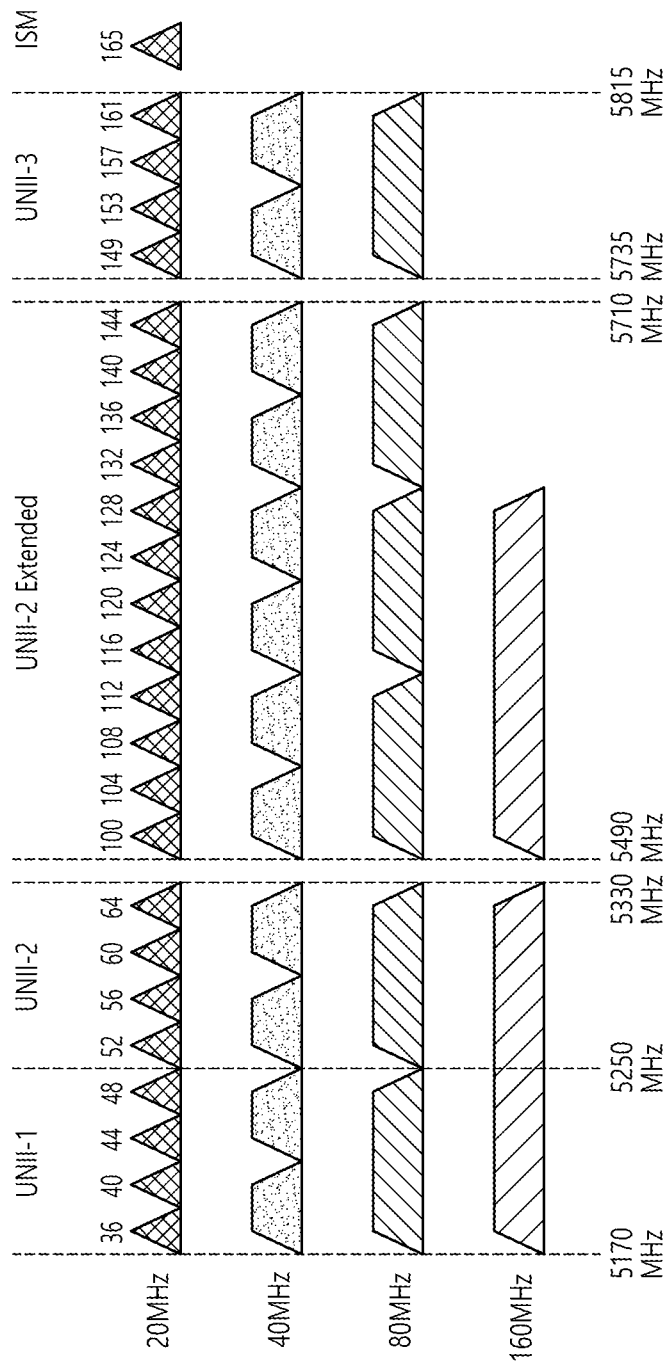
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
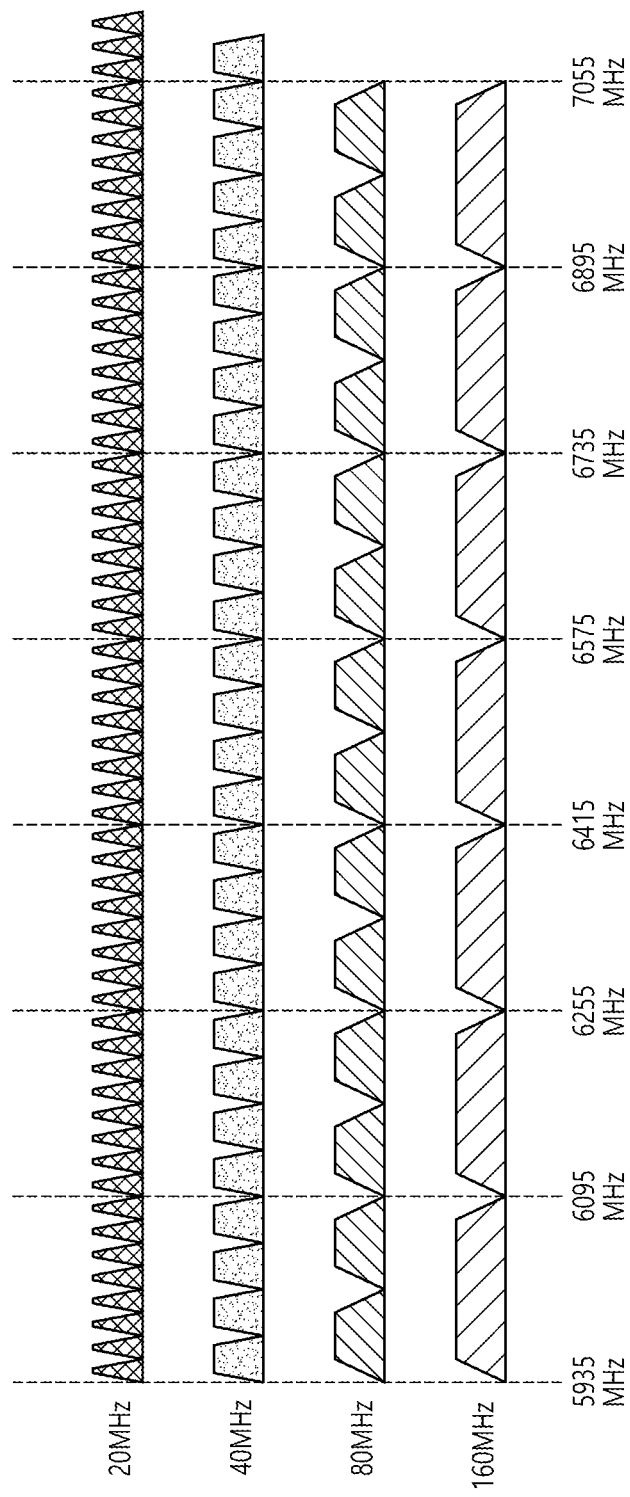
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
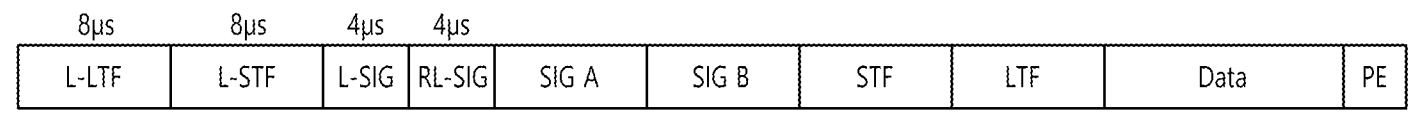

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 μs. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information on whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
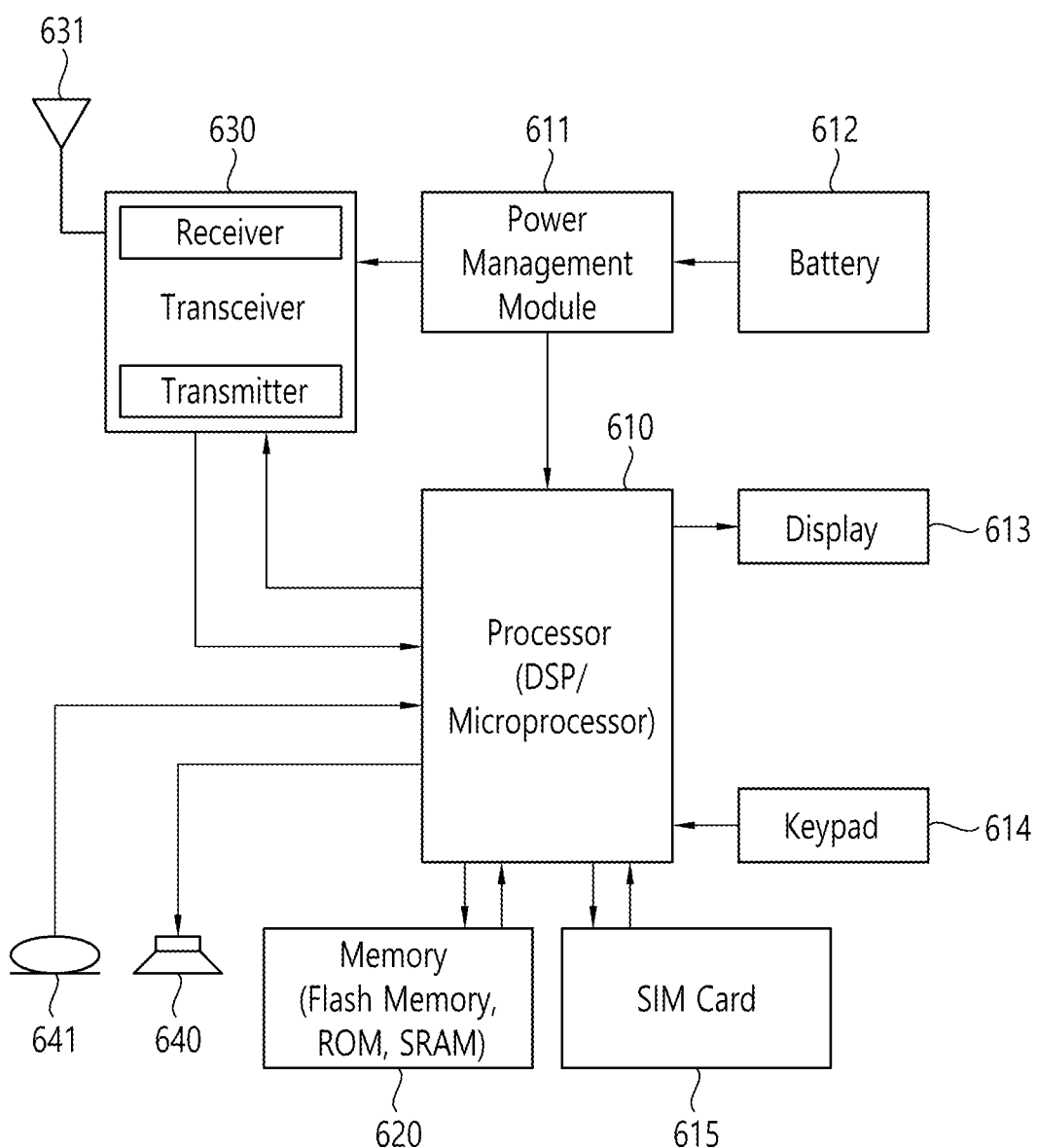
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Each device/STA in the sub-drawings (a)/(b) of FIG. 1 may further include a unit for supporting multiple links. Hereinafter, a structure of a transmitting/receiving apparatus for supporting multiple links may be described with reference to FIG. 20.

Figure 20:
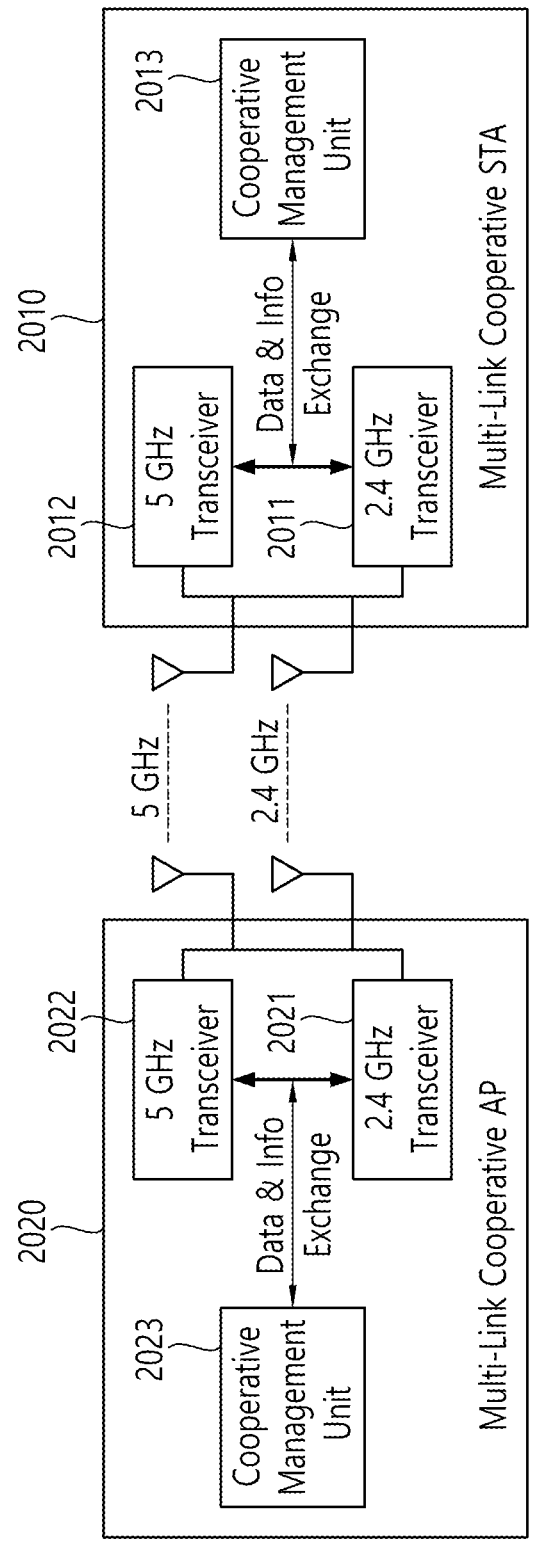
FIG. 20 shows an example of a transmitting/receiving apparatus for supporting multiple links.

FIG. 20 shows an example of a transmitting/receiving apparatus for supporting multiple links.

The STA 2010 and the AP 2020 may include a first transceiver supporting the first link and a second transceiver supporting the second link. In addition, it may include a cooperative management unit for controlling the first and second transceivers. The first link may include any one channel (for example, 20/40/80/160/240/320 MHz channel) on the first band (for example, 2.4 GHz, 5 GHz, or 6 GHz). The second link may include any one channel (for example, 20/40/80/160/240/320 MHz channel) on the second band (for example, 2.4 GHz, 5 GHz, or 6 GHz). It can include, that is, different links can exist on the same band or on different bands.

An example of FIG. 20 is an example in which the first link includes a 2.4 GHz band and the second link includes a 5 GHz band. Specifically, the STA 2010 of FIG. 20 may include a 2.4 GHz transceiver 2011, a 5 GHz transceiver 2012, and a Cooperative Management Unit 2020. That is, the 2.4 GHz transceiver 2011 is an example of the above-described first transceiver, and the 5 GHz transceiver 2012 is an example of the above-described second transceiver. In addition, the AP 2020 of FIG. 20 may include a 2.4 GHz transceiver 2021, a 5 GHz transceiver 2022, and a Cooperative Management Unit 2023.

For example, the STA 2010 and the AP 2020 may transmit and receive signals through the 2.4 GHz band and the 5 GHz band. In this case, the 2.4 GHz transceiver 2011 of the STA 2010 and the 2.4 GHz transceiver 2021 of the AP 2020 may transmit/receive signals in the 2.4 GHz band. The 5 GHz transceiver 2012 of the STA 2010 and the 5 GHz transceiver 2022 of the AP 2020 may transmit and receive signals in the 5 GHz band.

Although not shown, the STA 2010 may include a first RF unit (or a first base band module) and a second RF unit (or a second base band module). For example, the STA 2010 may generate/transmit a PPDU on a 20 MHz frequency domain of a 2.4 GHz band through the first RF unit, and may decode the received PPDU. In addition, the STA 2010 may generate/transmit a PPDU in a frequency domain of up to 160 MHz of a 5 GHz band through the second RF unit, and may decode the received PPDU. For example, the first RF unit may be included in the 2.4 GHz transceiver 2011. For example, the second RF unit may be included in the 5 GHz transceiver 2012. According to an embodiment, the first RF unit or the second RF unit may be implemented through various methods. For example, the first RF unit or the second RF unit may be configured independently of the 2.4 GHz transceiver 2011 or the 5 GHz transceiver 2012.

For example, when a signal of the 2.4 GHz band is transmitted using the RF unit for the 5 GHz and/or 6 GHz band, performance degradation of the corresponding RF unit may occur. Accordingly, the STA/AP 2010 and 2020 may additionally include an RF unit for the 2.4 GHz band that is distinguished from the RF unit for the 5 GHz and/or 6 GHz band. Accordingly, the STA/AP 2010 and 2020 may include a plurality of RF units. For example, the STA 2010 may include one RF unit for the 2.4 GHz band and three RF units for the 5 GHz and/or 6 GHz band. The STA 2010 may transmit/receive a signal in the 2.4 GHz band through one RF unit for the 2.4 GHz band. The STA 2010 may transmit/receive signals of 5 GHz and/or 6 GHz bands through three RF units for 5 GHz and/or 6 GHz bands. For example, the STA 2010 may process a wideband PPDU for a specific band through a plurality of RF units. In this specification, "RF Unit" may be simply denoted as "RF".

An STA (AP, non-AP) described below may perform multi-link communication based on the structure of FIG. 20. For example, the STA aggregates a first link (for example, an idle channel within a 2.4 GHz band) and a second link (for example, an idle channel within a 5G band), and may transmit the PPDU via the aggregated link (i.e., the first and second links) at the same time. More specifically, the STA may determine an idle channel in a first link, determine an idle channel in a second link, and aggregate idle channels.

This specification proposes a method for fast and efficiently saving power during flexible UL/DL transmission by using multi-band in an existing wireless LAN system.

FIG. 21 is an example of applying a flexible UL/DL scheme to a wireless LAN system.

FIG. 21 shows an example that the DL carrier occupies 160 MHz and the UL carrier occupies 160 MHz or 20 MHz. However, this is only an example, and the DL and UL may occupy different bandwidths (BW), and the BW of the DL and the BW of the UL do not need to be the same.

In addition, DL and UL may be located in the same band, but may be located in different bands. For example, DL may be defined in a 5 GHz band, and UL may be defined in a 2.4 GHz band. The opposite case is also possible.

FIG. 22 is an example in which DL or UL transmission is performed by a time division duplex (TDD) scheme in a multi-band (or multi-link) environment.

Flexible UL/DL can be operated as in the following example. The STA may transmit a DL PPDU on channel 1 (or channel band 1). Also, the STA may perform UL/DL transmission on channel 2 (or channel band 2) while the DL PPDU is transmitted on channel 1. Accordingly, UL/DL transmission in channel 2 can occur flexibly.

In order to operate as described above, RF chains for each DL and UL may be separately configured in the STA. In addition, in order to transmit and receive at the same time, the STA may include two baseband modules.

According to the present specification, an efficient power saving technique can be proposed for flexible DL/UL transmission in such a multi-band (or multi-link).

In the conventional Wi-Fi system, different data could be transmitted in each channel band. This specification may propose a method of performing power saving in all multi-links (or multi-bands) or some of the multi-links by using a feature (flexible DL/UL) capable of transmitting different data in each channel band. According to an embodiment of the present specification, by adjusting data between bands for efficient power saving, power saving efficiency in multi-links is increased.

The present specification may propose an example of a method for efficiently applying the power saving operation of 802.11 to multi-links. In multi-link, data queue for flexible UL/DL between links can be operated as one of the following.

A method in which a plurality of ULs and DLs are allocated to a secondary channel may be operated differently depending on which type of queue for a plurality of channel bands in the Wi-Fi system is among the following. Hereinafter, FIG. 23 shows a case in which an independent data queue is operated for each channel band (or link), and FIG. 24 may show a case where the integrated data queue is shared and operated by several channel bands (or links).

1) In Case of Operating an Independent Data Queue for Each Channel Band (Band-Specific)

Figure 23:
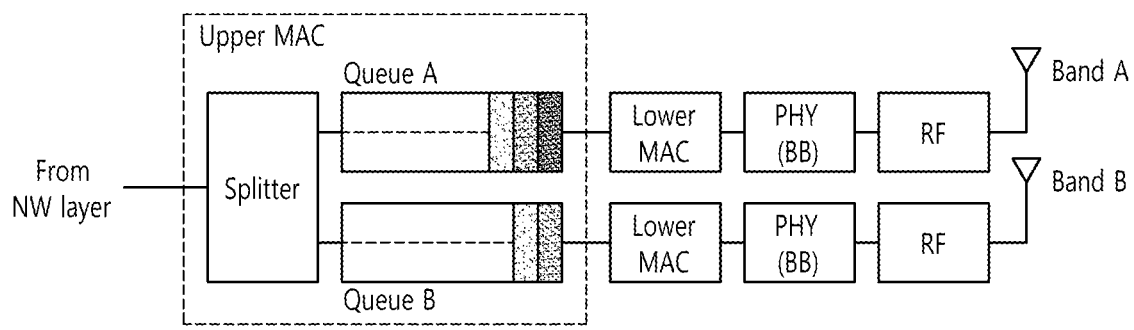
FIG. 23 is an example of operating an independent data queue for each channel band in a multi-band environment.

FIG. 23 is an example of operating an independent data queue for each channel band in a multi-band environment.

When an independent data queue is operated for each channel band as shown in FIG. 23, there may be a channel band with no data or relatively small data to be transmitted (called a secondary band) may occur. In this case, while the DL PPDU is allocated in the primary channel, the secondary channel may operate as follows depending on the data status of the queue.

<If there is Data in the Queue>

After transmitting the first (DL) data of the queue, the STA, which has received the DL PPDU transmitted through the secondary channel, may transmit a UL PPDU after SIFS (a value other than SIFS may be applied. For example, a value larger than SIFS and smaller than PIFS (Point Coordination Function Inter Frame Space)). In order to increase flexibility, the AP may transmit the UL PPDU to a STA other than the STA that transmitted the DL PPDU. Alternatively, the STA may transmit a DL PPDU for another STA instead of a UL PPDU. In this case, the maximum length of the UL PPDU may be set to be equal to or shorter than the end point of the DL PPDU transmitted through the primary channel. During the time interval (i) after the UL transmission is finished and (ii) before the DL PPDU transmission via the primary channel is finished, the secondary channel may perform the following operations.

Transmits the data in the queue during the time interval.
    Or, if there is data of a length that can be transmitted during that section among the data waiting in the queue, transmitting the data.

The above process can be repeated until one of the following is satisfied.

When PPDU transmission ends in the primary channel
    Alternatively, before a defined period of time (predefined time) than the end of PPDU transmission in the primary channel
    When it is determined that there is no more data to transmit in the queue of the secondary channel <If there is No Data in the Queue>

The STA that has not received any DL PPDU on the secondary channel may transmit the UL PPDU after SIFS from the time the PPDU is transmitted on the primary channel. Alternatively, a value other than SIFS may be applied. (For example, a value greater than SIFS and smaller than PIFS) In this case, the maximum length of the UL PPDU may be set to be the same as or shorter than the end point of the DL PPDU transmitted through the primary channel. During the time period from the end of the UL transmission to the end of the DL PPDU transmission in the primary channel, the secondary channel may perform the following operations.

Transmit if the highest priority data of the queue can be transmitted during the time period.

Alternatively, if there is a data with a length that can be transmitted during that section among the data waiting in the queue, transmitting the data.

The above process can be repeated until one of the following is satisfied.

When PPDU transmission ends in the primary channel

Alternatively, before a defined period of time (predefined time) than the end of PPDU transmission in the primary channel When it is determined that there is no more data to transmit in the queue of the secondary channel Alternatively, a plurality of channels described as secondary channels may be operated.

2) In Case of Sharing and Operating the Integrated Data Queue by Multiple Channel Bands (Common Queue)

Figure 24:
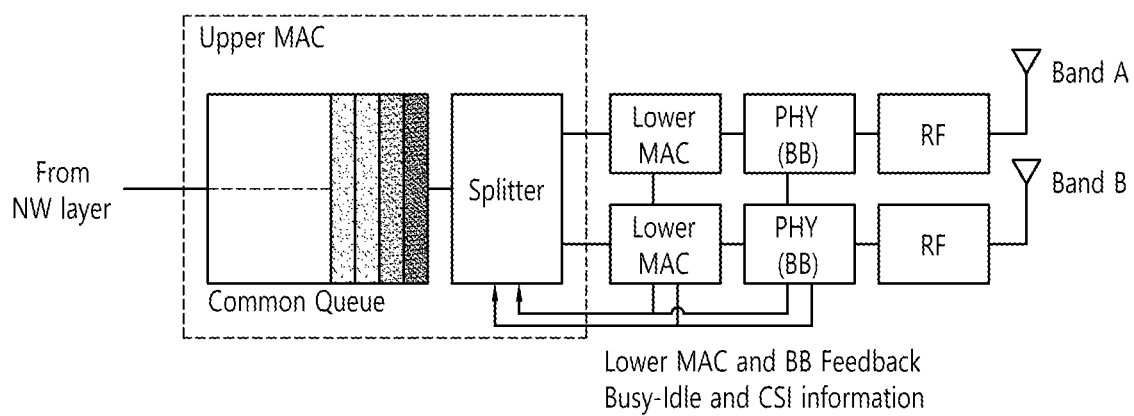
FIG. 24 is an example in which a plurality of channel bands share and operate an integrated data queue in a multi-band environment.

FIG. 24 is an example in which a plurality of channel bands share and operate an integrated data queue in a multi-band environment.

As shown in FIG. 24, when a plurality of channel bands are operated with one data queue, during the time allocated for the DL PPDU in the primary channel, a secondary channel that transmits a relatively short PPDU can be operated as follows depending on the data status of the queue.

After transmitting the allocated DL PPDU, the STA receiving the DL PPDU transmits the UL PPDU after SIFS. Alternatively, a value other than SIFS may be applied. (For example, a value greater than SIFS and smaller than PIFS) In this case, the maximum length of the UL PPDU may be set to be the same as or shorter than the end point of the DL PPDU transmitted through the primary channel.

During the time period from the end of the UL transmission to the end of the DL PPDU transmission in the primary channel, the secondary channel may perform the following operations.

Transmits the data in the queue during the time period.

Alternatively, among the data waiting in the queue, if there is data with a length that can be transmitted during the time period, transmitting the data.

The above process can be repeated until one of the following is satisfied.

When PPDU transmission ends in the primary channel

Alternatively before a certain time (pre-defined time) before PPDU transmission in the defined primary channel is terminated.

When it is determined that there is no more data to transmit in the queue via the secondary channel In addition, a plurality of channels described as secondary channels may be operated.

As described in FIGS. 23 to 24, different from the conventional single-band (or single-link), the AP can determine in which band to transmit data. Accordingly, the AP and the STA can perform an efficient power saving operation between multi-bands (or multi-links) through this. The present specification may propose a power saving operation to which all of the data queues shown in FIGS. 23 to 24 can be applied.

The power saving operation may include at least one of the following operations.

Power saving operation in baseband layer

RF power saving operation of channel band (or link)

Carrier sensing power saving operation

Power saving operation to maintain a doze state

Among the above-described power saving operations, a target wake time (TWT) operation may provide information necessary for a power saving operation. That is, the TWT operation may be configured such that the STA operates in a power saving mode for a specific time or wakes up for a specific time. In the following embodiments, in order to perform an efficient TWT operation in a multi-link environment in which multiple links are operated, a method for configuring the TWT to operate in one link among multi-links may be proposed. According to the following embodiments, there is an effect that can minimize the power consumption of the STA. In order to operate the TWT in one link among multi-links, three processes need to be defined.

1) First Embodiment—Method (or procedure) for establishing a link (or band) on which TWT operation is performed 2) Second embodiment—Method (or procedure) for waking up another link using a link (or band) on which TWT operation is performed 3) Third embodiment—Method (or procedure) for changing a link when the link (or band) on which the TWT operation is performed is changed Accordingly, herein, the three embodiments above may be described. The third embodiment may be included in the first embodiment and/or the second embodiment. Therefore, below, the first embodiment and the second embodiment may be described.

The First Embodiment—Method (or Procedure) for Establishing a Link (or Band) on which TWT Operation is Performed According to the first embodiment, a first STA may transmit a TWT setup request message to a second STA. The TWT setup request message may include information related to whether the first STA supports TWT operation in multi-link and/or TWT information for multi-link. For example, the TWT information for multiple links may include TWT SP allocation information for each link.

Thereafter, the first STA may receive a TWT setup response message from the second STA in response to the TWT setup request message. The TWT setup response message may include information related to a link on which a TWT operation is performed by the first STA and TWT information for multiple links (i.e., it includes TWT SP allocation information for each link). The first STA may determine a TWT operation (i.e., acquisition of TWT operation information and status of each link in the multi-links) state of the first STA for multi-links based on the TWT setup response message.

Here, the first STA may include a non-AP STA or a Non-AP multi-link device (MLD), preferably a Non-AP MLD, and may refer to a terminal operating in multi-link while having multi-link capability. The second STA may include an AP or an AP multi-link device (MLD), preferably AP MLD, and may refer to a terminal operating in multi-link while having multi-link capability. Hereinafter, a specific embodiment for explaining the operations of the first STA and the second STA may be described.

Figure 25:
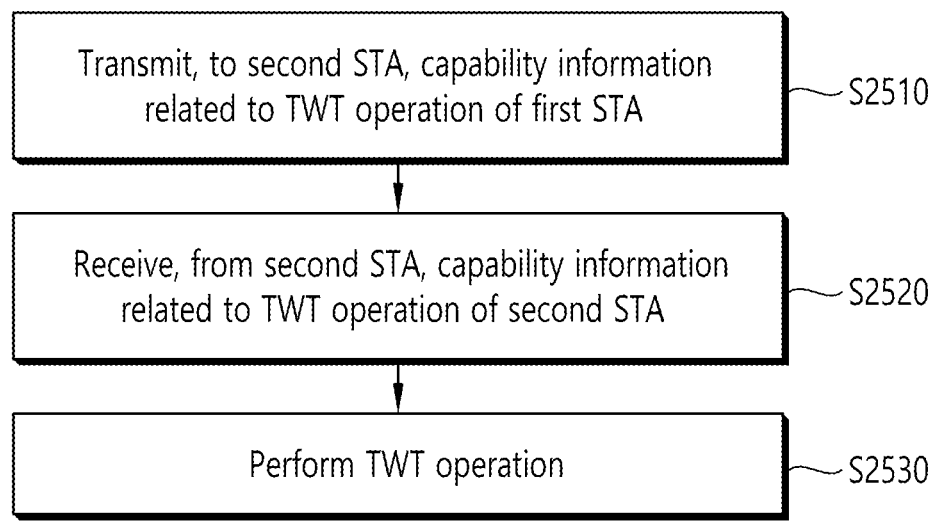
FIG. 25 is a diagram for explaining an embodiment for establishing a link on which a TWT operation is performed.

FIG. 25 is a diagram for explaining an embodiment for establishing a link on which a TWT operation is performed.

Referring to FIG. 25, in step S2510, the first STA may transmit, to the second STA, capability information related to the TWT operation of the first ST. That is, the above-described information related to whether the TWT operation is supported in the multi-link may include capability information regarding the TWT operation of the first STA.

That is, in order to perform a TWT operation on only one link among multi-links, the first STA may transmit, to the second STA, (i) information on whether the first STA can perform the TWT operation only on one link and/or (ii) information on whether the first STA can perform the TWT setup procedure (TWT Setup frame (Request & Response) exchange process) for multi-links through one link. For example, when a first STA transmits a frame to a second STA, the first STA may transmit information on whether the first STA can perform a TWT operation in one link by including it in the frame. For example, the frame may include a Probe Request frame, an Association Request frame, a Multi-link Setup Request frame, and/or a TWT Setup Request frame, and preferably an Association Request frame or a Multi-link Setup Request frame. For example, (i) information on whether the first STA can perform a TWT operation on one link and/or (ii) information on whether the first STA can perform the TWT setup procedure (TWT Setup frame (Request & Response) exchange process) for multi-links through one link may be included in the One Band/Link TWT operation capability field. The One Band/Link TWT operation capability field is only an example, and the field name may be changed differently.

According to an embodiment, when the first STA is capable of TWT operation in multi-links, the first STA may transmit, to the second STA, information about the number of links capable of TWT operation.

In step S2520, the first STA may receive, from the second STA, capability information regarding the TWT operation of the second STA. For example, the second STA may transmit, to the first STA, information about whether the second STA has One Band/Link TWT operation capability by including it in a frame. In other words, (i) information indicating that the second STA can perform a TWT operation through one link among multiple links, (ii) information on whether it is possible to perform TWT operation on multiple links in one link, or (iii) information on whether to support STAs capable of performing TWT Setup for multiple links through one link may be transmitted to the first STA. As an example of TWT, the frame may include a Probe Response, Association Response, Multi-link Setup Response frame, or TWT Setup Response frame, and preferably, may be included in an Association Response frame or a Multi-link Setup Response frame.

When the first STA includes One Band/Link TWT operation capability, the second STA may transmit, to the first STA, link information for the first STA to perform TWT operation in multi-links. In other words, the second STA may transmit, to the first STA, information about a link for the first STA to perform a TWT operation in multiple links based on the One Band/Link TWT operation capability of the first STA. In other words, when the first STA can perform a TWT operation through one of the multi-links, the second STA may transmit, to the first STA, one or more of (i) information about a link for the first STA to perform a TWT operation on a corresponding one link or (ii) information for entering another link into a doze state.

For example, information about a link for performing a TWT operation may be included in a TWT operation band/link index field. In addition, the TWT operation band/link index field may be included in the TWT element field. The above-described TWT operation band/link index field is only an example, and the field name may be changed differently. This information is preferably included in the TWT Setup Response frame or the Multi-link Setup Response frame among the above-mentioned Response frames.

According to an embodiment, when the first STA has the Multi-Band/Multi-Link TWT operation capability, the second STA may inform the first STA by including information on one or more links on which the first STA will perform the TWT operation in a frame transmitted to the first STA. In other words, when the first STA can perform the TWT operation in multi-links, the second STA may transmit, to the first STA, information about one or more links on which the first STA will perform the TWT operation. This information is preferably included in the TWT Setup Response frame or the Multi-link Setup Response frame among the above-mentioned Response frames.

For example, the second STA may transmit, to the first STA, information about one or more links for the first STA to perform a TWT operation, based on the Multi-Band/Multi-Link TWT operation capability of the first STA. As an example, information about one or more links for performing a TWT operation may be included in a TWT operation band/link index field. In addition, the TWT operation band/link index field may be included in the TWT element field.

In step S2530, the first STA may perform a TWT operation. Specifically, the first STA may receive, from the second STA, information about a link (TWT operation link) for performing a TWT operation (or TWT operation band information). The first STA may perform the TWT operation only on the allocated link (or band) by using the information on the link on which the TWT operation is to be performed.

Upon receiving, from the second STA, the information on the link to perform the TWT operation, immediately or later (after transmitting a frame including PM bit=1), the first STA may change the mode (or state) of the first STA to a power saving (PS) mode. When the first STA operates in PS mode, for a link (or band) that is not indicated in the information on the link to which the TWT operation is to be performed (or TWT operation band information), the first STA operates may continue to operate in the low-power mode (for example, a doze state) until there is a special instruction (or signal). The first STA in the PS mode may perform a power saving operation, based on the operation defined in the TWT element field in the link indicated in the link information (or TWT operation band information) on which the TWT operation is to be performed. Here, the power saving operation may mean that an awake state and a doze state are appropriately changed to operate. An example in which the first STA performs a power saving operation based on an operation defined in the TWT element field may be described below.

The conventional TWT operation may be performed based on the TWT parameter information field of the TWT element field in a beacon frame or a TWT Setup frame (Request/Response). Hereinafter, the TWT element field may be described in FIG. 26. In addition, the control field of the TWT element field may be described in FIG. 27.

Figure 26:
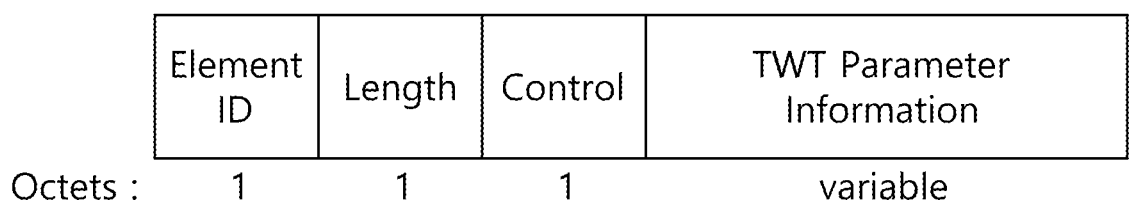
FIG. 26 shows an example of a TWT element field.

FIG. 26 shows an example of a TWT element field.

Referring to FIG. 26, the TWT element field may include an element identifier (ID) field, a length field, a control field, and/or a TWT parameter information field.

The Element ID field may include information about IDs assigned to various elements (for example, Service Set Identifier (SSID)).

The Control field may include information about TWT operation control. A detailed field configuration related to the Control field may be described later with reference to FIG. 27.

The TWT parameter information field may be configured differently based on the Broadcast subfield of the Control field. For example, based on the value of the Broadcast subfield being '0', the TWT Parameter Information field may be configured in the form of an Individual TWT Parameter set field. For another example, based on the value of the Broadcast subfield being '1', the TWT Parameter Information field may be configured in the form of a Broadcast TWT Parameter set field.

FIG. 27 shows an example of the Control field of the TWT element field.

Referring to FIG. 27, the Control field may include a Null Data PPDU (NDP) Paging Indicator field, a Responder Power Management (PM) Mode field, a Negotiation Type field, and/or a Reserved field. A field included in the Control field may be referred to as a subfield. For example, the NDP Paging Indicator field may be referred to as an NDP Paging Indicator subfield. As another example, the Negotiation Type field may be referred to as a Negotiation Type subfield.

The NDP Paging Indicator field may include information on whether the NDP Paging field exists. For example, based on that the NDP Paging Indicator field is set to '1', the NDP Paging field may be configured. For another example, based on the NDP Paging Indicator field being set to '0', the NDP Paging field may not be configured.

The Responder PM Mode field may include information on PM mode.

The Negotiation Type field may inform (or indicate) whether information included in the TWT element is for Broadcast TWT, individual TWT, or Wake TBTT (Target Beacon Transmission Time) interval.

According to an embodiment, the STA may distinguish whether a TWT is either the individual TWT or the broadcast TWT based on the Negotiation Type field of the Control field. The Most Significant Bit (MSB) of the Negotiation Type field may be the above-described Broadcast subfield.

In the present specification, a method for performing a multi-link TWT operation based on one TWT element that is not previously defined is proposed. The TWT element may include TWT information. That is, in the present specification, a method for notifying that current TWT information (TWT information included in a TWT element) is information for operation in a multi-link is proposed. N bit may be used to inform that the current TWT information is information for operation in multi-link. The N may be an integer. In other words, a plurality of bits may be used to indicate that the TWT information is information for operation in a multi-link. That is, the plurality of bits may include information related to whether TWT information is performed in multi-link.

The STA may inform that the current TWT information is information for operation in a multi-link through the TWT element field of FIG. 26 described above. However, for this purpose, various fields may be used without being limited to the TWT element field.

According to an embodiment, in order to inform that a TWT operation is performed in a multi-link, the N bit may be configured as follows.

When the value of N bit is '0', TWT does not operate.
When the value of N bit is '1', the TWT operates only on the link that receives the TWT (or TWT information).
When the value of N bit is a positive integer greater than '2', the TWT operates on other links including the link that receives the TWT (or TWT information). Here, the number of other links may be set to a value of N bits.

According to an embodiment, the proposed information may be transmitted through a TWT element field. Accordingly, the proposed information may be transmitted through step S2520 of FIG. 25. However, the present specification is not limited thereto, and the proposed information may be transmitted through at least one of steps S2510, S2520, and S2530 of FIG. 25.

Figure 28:
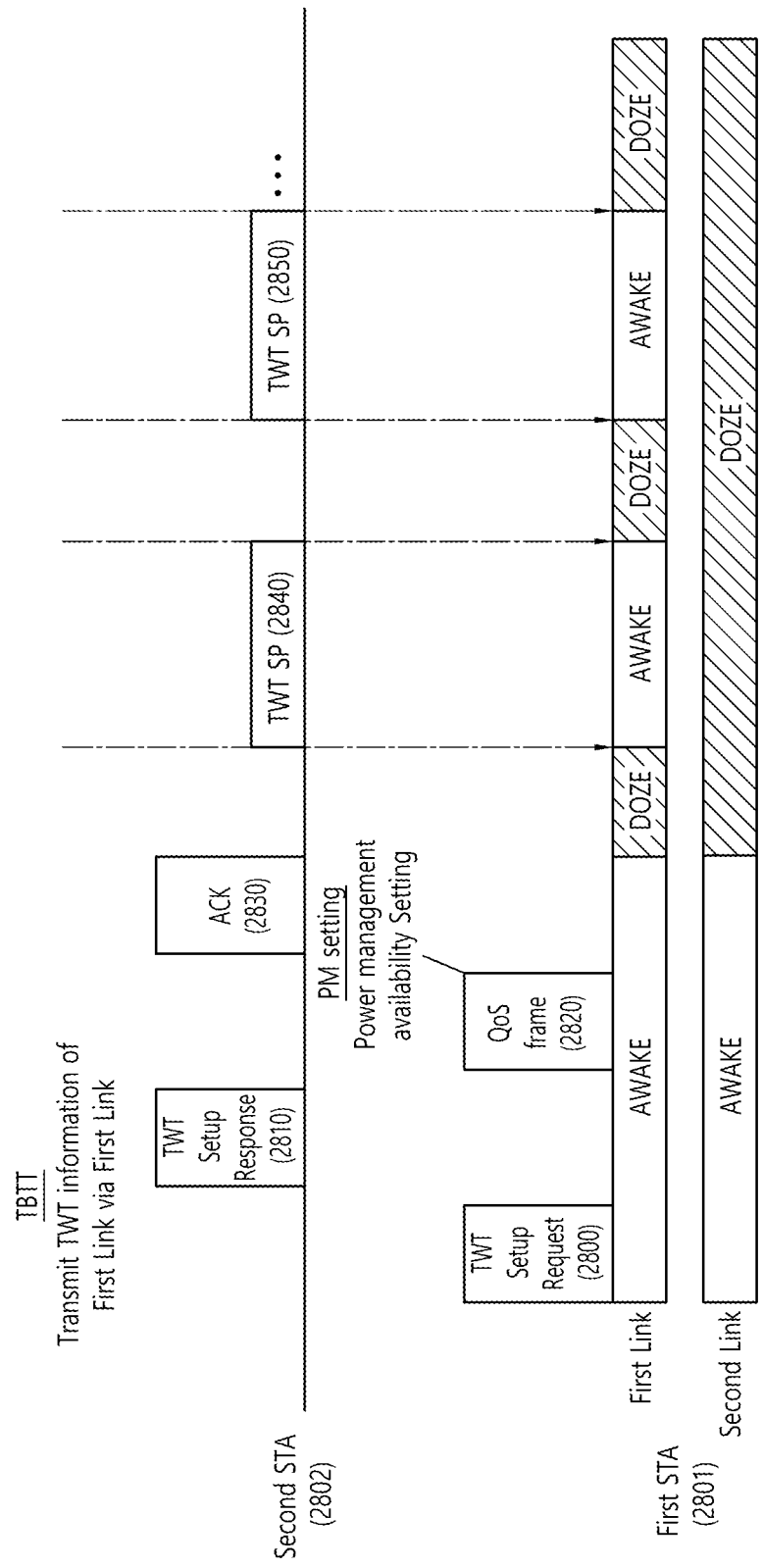
FIG. 28 is a diagram for describing operations of a first STA and a second STA for performing a TWT operation.

FIG. 28 is a diagram for describing operations of a first STA and a second STA for performing a TWT operation.

Referring to FIG. 28, the operation illustrated in FIG. 28 may relate to communication between a first STA 2801 and a second STA 2802. For example, the first STA 2801 may be a non-AP STA. Also, the second STA 2802 may be an AP. The operation shown in FIG. 28 may represent an example of the present specification, and some features may be omitted/modified.

According to an embodiment, the first STA 2801 may transmit a TWT Setup Request frame 2800 to the second STA 2802. According to an embodiment, the first STA 2801 may transmit various frames to the second STA 2802 instead of the TWT Setup Request frame 2800. For example, the various frames may include a Probe Request frame, an Association Request frame, and/or a TWT Setup Request frame, etc.

The TWT Setup Request frame 2800 or the various frames may include the information described in step S2510. For example, the TWT Setup Request frame 2800 may include information on whether the first STA 2801 can perform a TWT operation through one link.

According to an embodiment, the TWT Setup Response frame 2810 may be transmitted in TBTT (Target Beacon Transmission Time), but in this example, an example of transmitting the TWT Setup Response in response to the TWT Setup Request is shown. In addition, the TWT Setup Response frame 2810 may indicate that the TWT operates only in the first link through the TWT element field. (Information indicating that the TWT operates only on this first link may also be included and transmitted in the TWT Setup Request.) In other words, the TWT Setup Response frame 2810 may include a TWT element field. In addition, the TWT element field may include information indicating that the TWT operates only in the first link.

Accordingly, during the first TWT Service Period (SP) 2840 and the second TWT SP 2840, the first link may operate in an awake state. Also, during the first TWT SP 2840 and the second TWT SP 2840, the second link may operate only in a doze state.

According to an embodiment, after receiving the TWT Setup Response frame 2810, the first STA 2801 may transmit, to the second STA, information for entering the power saving mode (PM set to 1). In FIG. 28, a QoS frame 2820 may be transmitted to the second STA 2802. The first STA 2801 may indicate (PM=1) that the first STA 2801 is capable of performing a power management operation based on the QoS frame 2820. In other words, the first STA 2801 may transmit, to the second STA 2802, information indicating that the first STA 2801 can perform a power management operation based on the QoS frame 2820.

For example, the first STA 2801 sets the value of the Power Management (PM) field of the QoS frame 2820 to a preset value (for example, '0' or '1'), so that it may indicate that the STA 2801 is capable of performing a Power Management operation. As an example, when the value of the Power Management (PM) field is set to a first value (for example, '0'), the (PM) field may indicate that the first STA 2801 cannot perform the Power Management operation. When the value of the PM field is set to a second value (for example, '1'), the PM field may indicate that the first STA 2801 can perform a power management operation.

According to an embodiment, the second STA 2802 may transmit, to the first STA 2801, an ACK frame 2830 in response to the QoS frame. That is, the first STA 2801 may receive, from the second STA 2802, the ACK frame 2830 in response to the QoS frame.

According to an embodiment, information on whether TWT information is performed in multi-link may be transmitted to the STA through various fields. In other words, information on whether the TWT operation is performed in multi-link may be transmitted to the STA through various fields. In other words, information on whether TWT information is used in multi-link may be transmitted to the STA through various fields. The various fields may be included in the TWT element field. Hereinafter, an example of a field including information on whether a TWT operation is performed in a multi-link may be described.

1) One Band/Link Only TWT Operation Indication Field

The One band/link only TWT operation indication field may be a field for configuring an STA (for example, a first STA) capable of multi-link (or multi-band) operation to operate TWT in one link (or band). For example, when the first STA intends to perform a TWT operation through one link, the first STA may set the One band/link only TWT operation indication field to a first value (for example, '1'). For another example, when the first STA does not want to perform a TWT operation through one link, the first STA may set the One band/link only TWT operation indication field to a second value (for example, '0').

2) TWT Operation Band/Link Index Field

When the One band/link only TWT operation indication field is set to a first value (for example, '1'), the TWT operation band/link index field may be optionally included in the TWT element field. The TWT operation band/link index field may indicate a link (or band) on which a TWT operation is performed. In other words, the TWT operation band/link index field may include information about a link (or band) on which a TWT operation is performed.

For example, when the TWT operation band/link index field is set to a first value (for example, '0'), the TWT operation band/link index field may indicate a link through which the TWT operation band/link index field is transmitted. When the TWT operation band/link index field is set to a second value (for example, '1'), the TWT operation band/link index field may indicate a second link different from the link through which the TWT operation band/link index field is transmitted. When the TWT operation band/link index field is set to a third value (for example, '2'), the TWT operation band/link index field may indicate a third link different from the link through which the TWT operation band/link index field is transmitted.

For another example, when the TWT operation band/link index field is set to a first value (for example, '0'), the TWT operation band/link index field may indicate a 2.4 GHz band. When the TWT operation band/link index field is set to a second value (for example, '1'), the TWT operation band/link index field may indicate a 5 GHz band. When the TWT operation band/link index field is set to a third value (for example, '2'), the TWT operation band/link index field may indicate a 6 GHz band.

For another example, the TWT operation band/link index field may indicate information about a link (or band) on which a TWT operation is performed through various methods. In other words, the TWT operation band/link index field may indicate a link (or band) on which the TWT operation is performed through various methods.

Based on the above-described information, the STA (for example, the first STA or the second STA) may acquire information about a link (or band) on which to perform a TWT operation. The STA may perform a TWT operation based on information included in the TWT element field in a designated link.

Hereinafter, operations of the first STA and the second STA may be described with reference to FIG. 29. The order of the features shown in FIG. 29 may be changed, and some steps may be omitted.

Figure 29:
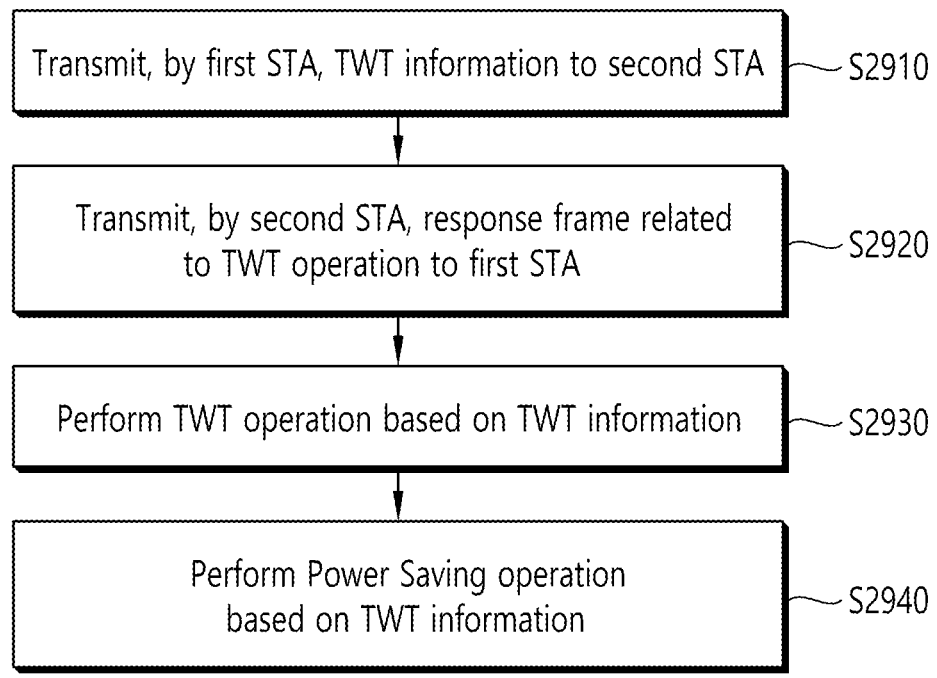
FIG. 29 is a diagram for describing operations of a first STA and a second STA for performing a TWT operation.

FIG. 29 is a diagram for describing operations of a first STA and a second STA for performing a TWT operation.

Referring to FIG. 29, in step S2910, a first STA (for example, a first STA 2801) may transmit TWT information to a second STA (for example, a second STA 2802). For example, the first STA may transmit information about whether the first STA can perform the TWT operation in one link (or band) by including it in a frame. That is, the TWT information may include (i) information on whether a TWT operation can be performed on one link (or band) and/or (ii) information on whether the TWT setup procedure for multi-links can be performed through one link (or band). In other words, the TWT information may include capability information related to performing a TWT operation. The TWT information may be included in a Probe Request frame, an Association Request frame, a Multi-link Setup Request frame, and/or a TWT Setup Request frame. Preferably, the TWT information may be included in an Association Request frame or a Multi-link Setup Request frame.

Step S2910 may be the same as or correspond to step S2510 of FIG. 25 described above. In other words, step S2910 may be related to step S2510 of FIG. 25 described above.

In step S2920, the second STA may transmit, to the first STA, a response frame related to the TWT operation. The second STA may include information on whether it (the second STA) can perform the TWT operation in one link (or band) (that is, information on whether there is One Band/Link TWT operation capability) in a response frame transmitted to the first STA. For example, information on whether the TWT operation can be performed in one link (or band) may be included in the One band/link only TWT operation indication field.

For example, when the first STA having multi-link operation capability performs TWT operation only on one link (or band), the One band/link only TWT operation indication field may be set to a first value (for example, '1'). For another example, when the first STA having multi-link operation capability performs TWT operation on a plurality of links, the One band/link only TWT operation indication field may be set to a second value (for example, '0').

According to an embodiment, when the first STA has One Band/Link TWT operation capability, the second STA may transmit, to the first STA, information about a link (or band) on which the first STA will perform a TWT operation.

According to an embodiment, when the first STA has multi-link (or multi-band) TWT operation capability, the second STA may transmit, to the first STA, (i) information on one or more links and/or (ii) TWT information for multi-links on which the first STA will perform a TWT operation. For example, TWT information for multiple links may include TWT SP allocation information for each link. In other words, when the first STA can perform the TWT operation in multi-links, the second STA may transmit, to the first STA, information about one or more links on which the first STA will perform a TWT operation. Information on one or more links for performing a TWT operation may be included in the TWT operation band/link index field.

The response frame may include a Probe Response, Association Response, Multi-link Setup Response frame, or TWT Setup Response frame, etc. Preferably, the response frame may include an Association Response frame or a Multi-link Setup Response frame.

Step S2920 may be the same as or correspond to step S2520 of FIG. 25 described above. In other words, step S2920 may be related to step S2520 of FIG. 25 described above.

In step S2930, the first STA and the second STA may perform a TWT operation based on the TWT information.

For example, the first STA and the second STA may perform communication in a TWT service period (SP) based on TWT information for the multi-link. The first STA may operate in an awake state in the TWT SP.

For example, the first STA may perform the TWT operation on the allocated link based on information, received from the second STA, about the link on which the TWT operation is to be performed. As an example, the first STA may receive, from the second STA, information about the first link, which is a link for performing the TWT operation. The first STA may perform a TWT operation on the first link based on the information on the first link.

In step S2940, the first STA and the second STA may perform a power saving operation based on the TWT information.

The Second Embodiment—Method (or Procedure) for Waking Up Another Link Using a Link (or Band) on which TWT Operation is Performed The first STA (for example, non-AP STA) supporting multi-link (or multi-band) may perform the TWT operation only on at least one link (for example, one link) among the multi-links. In this case, the remaining links may maintain a low-power state. When the second STA (for example, AP) intends to transmit a frame to the first STA through a multi-link, the second STA may wake up a link that is in a doze state through a link on which a TWT operation is performed. In other words, the second STA may change a link maintaining a low power state (or a doze state) to an awake state through a link on which a TWT operation is performed. In this case, both links can exchange control information with each other.

When inter-link control information can be exchanged in the multi-link, the first STA may wake up, through a link on which a TWT operation is currently performed (hereinafter, a TWT primary link), a link other than the TWT primary link. The TWT primary link may be configured to be the same as the primary channel band, or may be configured differently. For the convenience of the description below, a link other than the TWT primary link may be referred to as another link.

When it is necessary to change another link to an awake state while performing a TWT operation on the TWT primary link, the second STA may transmit, to the first STA, information for changing the other link to the awake state through the TWT primary link (e.g., buffered traffic indication for the other link). In this case, the second STA may transmit the frame by including various information in at least one of the frames to be transmitted to the first STA. Examples of the above various information may be described below.

For example, the second STA may transmit, to the first STA, information on a link to change to the awake state. The information about the link to be changed to the awake state may include a link (or band) index and information about the number of links. The information about the link to be changed to the awake state may include information about one or more links.

As another example, the second STA may transmit, to the first STA, information about a time to change to the awake state. That is, the second STA may additionally transmit, to the first STA, information about an awake start time for a link to be changed to the awake state.

Figure 30:
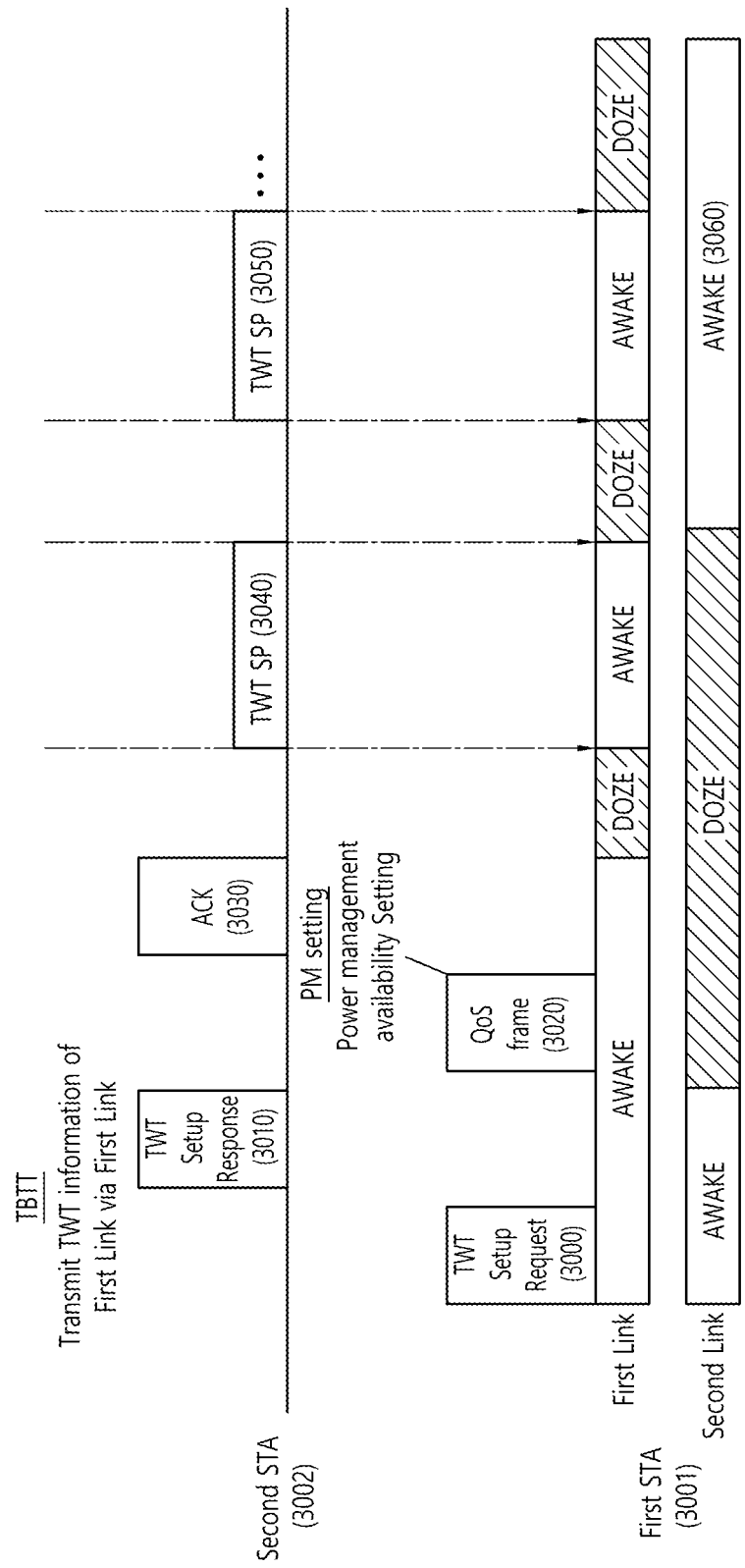
FIG. 30 is a diagram for explaining operations of a first STA and a second STA for changing a link performing a TWT operation.

FIG. 30 is a diagram for explaining operations of a first STA and a second STA for changing a link performing a TWT operation.

Referring to FIG. 30, the operation illustrated in FIG. 30 may relate to communication between a first STA 3001 and a second STA 3002. For example, the first STA 3001 may be a non-AP STA. Also, the second STA 3002 may be an AP. The operation shown in FIG. 30 represents an example of the present specification, and some features may be omitted/modified. In addition, since the operation shown in FIG. 30 is a modified example of FIG. 28, the basic features of FIG. 28 may be equally applied to FIG. 30.

The operation in which the first STA 3001 and the second STA 3002 exchange a TWT Setup Request frame 3000, a TWT Setup Response frame 3010, a QoS frame 3020, or an ACK frame 3030, may be related to the operation in which the first STA 2801 and the second STA 2802 exchange a TWT Setup Request frame 2800, a TWT Setup Response frame 2810, a QoS frame 2820, or an ACK frame 2830 of FIG. 28.

According to an embodiment, during the first TWT SP 3040, the second STA 3002 may additionally transmit information for changing the second link of the first STA 3001 to the awake state. The first STA 3001 may receive information for changing the second link to the awake state. The first STA 3001 may determine a time period 3060 to operate as the awake state based on information for changing the second link to the awake state. Accordingly, the first STA 3001 may maintain/set the awake state for the second link during the time period 3060. That is, the first STA 3001 may maintain/set both the first link and the second link in an awake state during the second TWT SP 3050. In other words, the first STA 3001 may perform a TWT operation over both the first link and the second link during the second TWT SP 3050.

According to an embodiment, although not shown in FIG. 30, the first STA 3001 may receive, from the second STA 3002, information for changing the first link to a doze state while performing a TWT operation through both the first link and the second link. The first STA 3001 may change the first link to the doze state during the third TWT SP, based on the information for changing the first link to the doze state. Also, the first STA 3001 may set the second link to the awake state during the third TWT SP, based on the information for changing the first link to the doze state.

Figure 31:
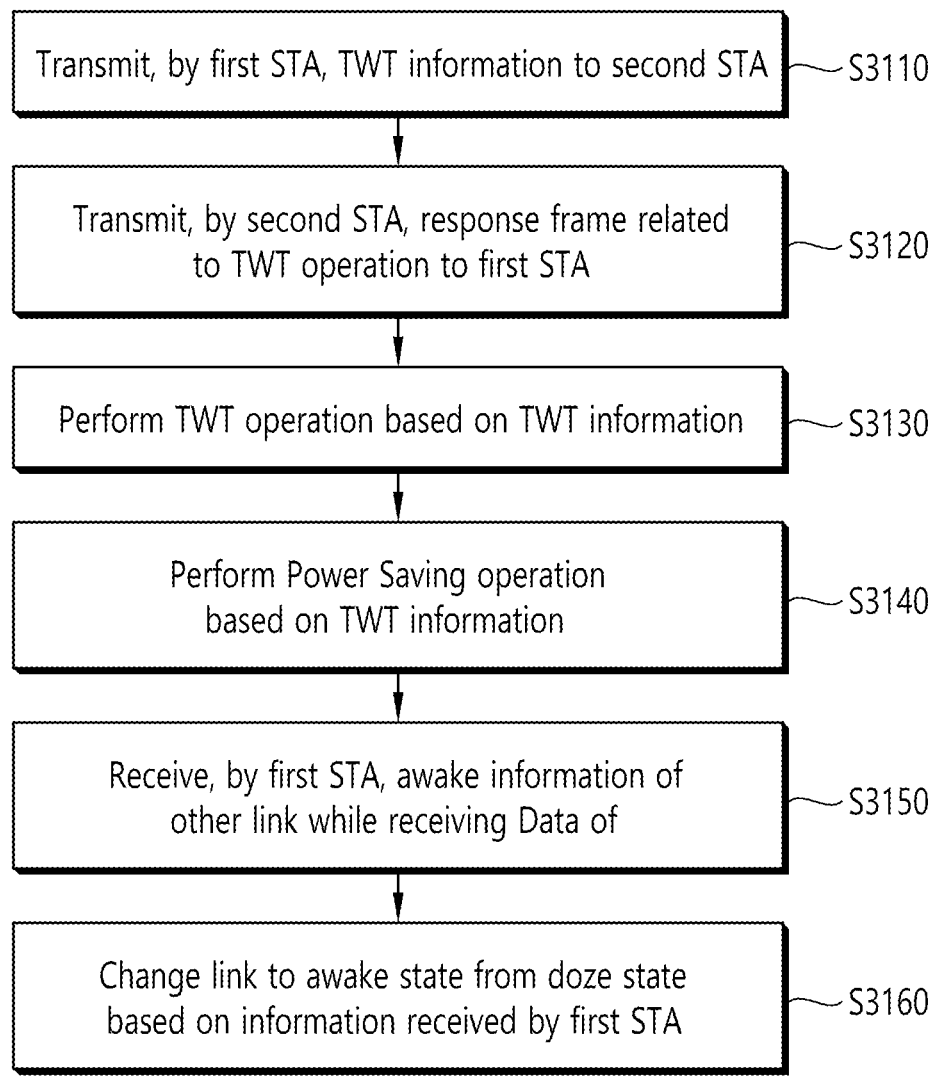
FIG. 31 is a diagram for describing operations of a first STA and a second STA for performing a TWT operation.

FIG. 31 is a diagram for describing operations of a first STA and a second STA for performing a TWT operation.

Referring to FIG. 31, in step S3110, a first STA (for example, a first STA 3001) may transmit TWT information to a second STA (for example, a second STA 3002). For example, the first STA may transmit information on whether the first STA can perform the TWT operation in one link (or band) by including it in a frame. The frame may include a Probe Request frame, an Association Request frame, and/or a TWT Setup Request frame.

That is, the TWT information may include information on whether the TWT operation can be performed in one link (or band). In other words, the TWT information may include capability information related to performing a TWT operation.

Step S3110 may be the same as or correspond to step S2510 of FIG. 25 or step S2910 of FIG. 29 described above. In other words, step S3110 may be related to step S2510 of FIG. 25 or step S2910 of FIG. 29 described above.

In step S3120, the second STA may transmit a response frame related to the TWT operation to the first STA. The second STA may include information on whether it can perform the TWT operation in one link (or band) (that is, information on whether there is One Band/Link TWT operation capability) in a frame, which is transmitted to the first STA. For example, the frame may include a Probe Response, Association Response, or TWT Setup Response frame.

When the first STA can perform the TWT operation on one link (or band), the second STA may transmit, to the first STA, information about a link (or band) on which the first STA will perform a TWT operation (or information about a TWT operation link).

Step S3120 may be the same as or correspond to step S2520 of FIG. 25 or step S2920 of FIG. 29 described above. In other words, step S3120 may be related to step S2520 of FIG. 25 or step S2920 of FIG. 29 described above.

In steps S3130 and S3140, the first STA may perform the TWT operation only on the allocated link based on the information, received from the second STA, about the link on which the TWT operation is to be performed. When the first STA, that has obtained information about the link to perform the TWT operation from the second STA, enters the PS mode or is in the PS mode, it may continue to operate in a low-power mode (for example, in a doze state) for a link, that is not indicated in the information on the link on which the TWT operation is to be performed, until there is a special indication (or signal) for the link.

In steps S3150 and S3160, the first STA in the PS mode may perform a power saving operation on the link indicated in the link information on which the TWT operation is to be performed, based on the operation defined in the TWT element. Herein, the power saving operation may mean that an awake state and a doze state are appropriately changed to operate.

While the first STA is performing a power saving operation, the first STA may receive information for changing a link, that is not indicated in information on a link performing a TWT operation, to an awake state. For example, the information for changing the link to the awake state may include information about the link for changing to the awake state and/or information about a time point for changing the link to the awake state. As another example, the information for changing the link to the awake state may include information about a buffered traffic indication for the link.

The first STA may change the link currently operating in the doze state to the awake state, based on the information for changing the link to the awake state.

Figure 32:
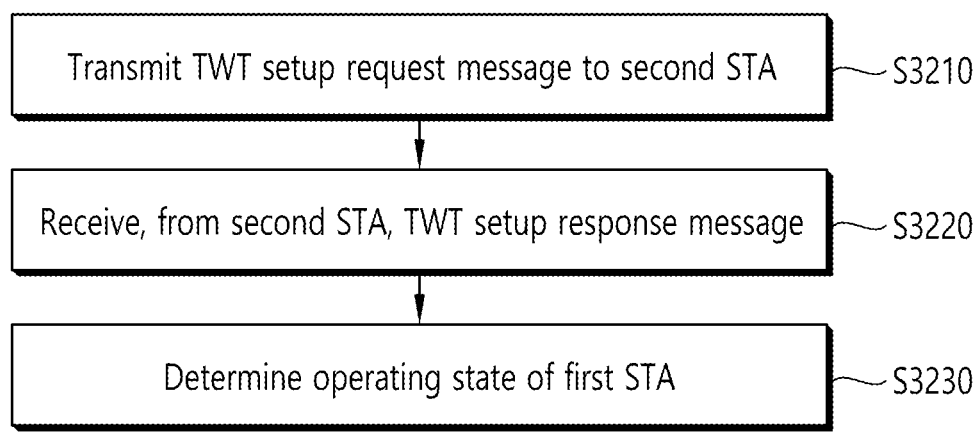
FIG. 32 is a flowchart illustrating an operation of a first STA.

FIG. 32 is a flowchart illustrating an operation of a first STA.

Referring to FIG. 32, in step S3210, the first STA may transmit a TWT setup request message to the second STA. The TWT setup request message may include information related to whether the first STA supports TWT operation in multi-link.

According to an embodiment, the first STA may support a multi-link including a first link and a second link. In addition, the first STA may support TWT operation in multi-link. The first link and the second link may be included in any one of a 2.4 GHz band, a 5 GHz band, or a 6 GHz band.

According to an embodiment, the TWT setup request message may include information related to a link in which the first STA supports the TWT operation. For example, if the first STA supports multi-link including the first link and the second link, the TWT setup request message may include information indicating that the TWT operation is supported in the first link and the second link.

According to an embodiment, the TWT setup request message may further include information on the number of links capable of TWT operation in multi-links.

According to an embodiment, the TWT setup request message may include information informing that the first STA performs a TWT operation through one link. For example, the first STA may transmit, to the second STA, information informing that the TWT operation can be performed through only one of the first link and the second link.

In step S3220, the first STA may receive, from the second STA, a TWT setup response message. The TWT setup response message may include information about a link on which a TWT operation is performed. For example, the TWT setup response message may include information about at least one link on which a TWT operation is performed among the first link and the second link.

According to an embodiment, the TWT setup response message may include information about a TWT service period (SP) for the first STA. Here, the TWT SP may mean a time period during which the first STA maintains the awake state. For example, the information about the TWT SP may include information about the start time and end time of the TWT SP. For another example, the information on the TWT SP may include information on the start time of the TWT SP and the duration of the TWT SP. According to an embodiment, the TWT setup response message may include information for maintaining the awake state of the first link in the TWT SP.

According to an embodiment, the TWT setup request message and the TWT setup response message may be transmitted/received through the same link. For example, the first STA may transmit and receive a TWT setup request message and a TWT setup response message through the first link.

In step S3230, the first STA may determine the operating state of the first STA based on the TWT setup response message. For example, the first STA may determine the operating states of the first link and the second link of the first STA based on the TWT setup response message. The first STA may keep the first link in the awake state in the TWT SP. Also, the first STA may keep the second link in a doze state in the TWT SP.

According to an embodiment, the first STA may transmit, to the second STA, a control frame in response to the TWT setup response message. The control frame may include a QoS frame.

The first STA may receive, from the second STA, an ACK frame for the control frame. After receiving the ACK frame, the first STA may change the first link included in the multi-link to a doze state. In other words, after receiving the ACK frame, the first STA may change the first link from the awake state to the doze state. Thereafter, the first STA may change the first link from the doze state to the awake state based on the TWT setup response message.

According to an embodiment, after changing the first link to the awake state, the first STA may receive information related to the TWT SP for the second link included in the multi-link. The first STA may change the second link from the doze state to the awake state based on information related to the TWT SP for the second link. Thereafter, the first STA may perform a TWT operation through both the first link and the second link.

Figure 33:
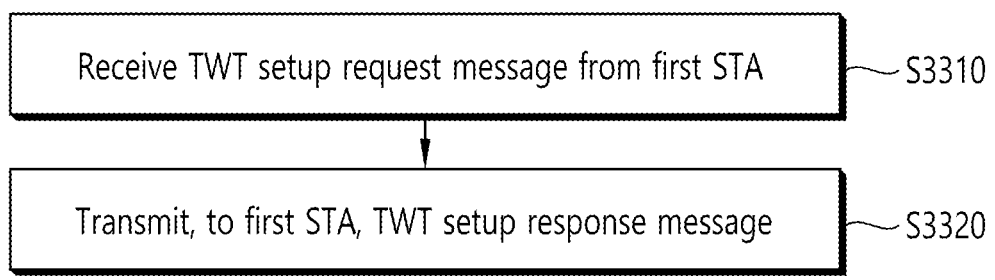
FIG. 33 is a flowchart illustrating an operation of a second STA.

FIG. 33 is a flowchart illustrating an operation of a second STA.

Referring to FIG. 33, in step S3310, the second STA may receive a TWT setup request message from the first STA.

According to an embodiment, the TWT setup request message may include information related to a link in which the first STA supports the TWT operation. For example, when the first STA supports a multi-link including a first link and a second link, the TWT setup request message may include information indicating that the TWT operation is supported in the first link and the second link.

According to an embodiment, the second STA may determine a link on which a TWT operation is performed based on the TWT setup request message. For example, the second STA may determine a first link among the first link and the second link as a link on which a TWT operation is performed. For another example, the second STA may determine both the first link and the second link as links on which a TWT operation is performed.

In step S3320, the second STA may transmit a TWT setup response message to the first STA. According to an embodiment, the TWT setup response message may include information related to a link on which a TWT operation is performed in the first STA.

According to an embodiment, the TWT setup response message may include information about a TWT service period (SP) for the first STA. Here, the TWT SP may mean a time period during which the first STA maintains the awake state. For example, the information about the TWT SP may include information about the start time and end time of the TWT SP. For another example, the information on the TWT SP may include information on the start time of the TWT SP and the duration of the TWT SP. According to an embodiment, the TWT setup response message may include information for maintaining the awake state of the first link in the TWT SP.

According to an embodiment, the second STA may receive, from the first STA, the control frame in response to the TWT setup response message. The control frame may include a QoS frame. The second STA may transmit, to the first STA, an ACK frame in response to the control frame. Thereafter, the second STA may transmit/receive, to/from the first STA, a signal during the TWT SP.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, the apparatus of the present specification includes a memory and a processor operatively coupled to the memory. The processor may be configured to transmit, to the second STA, a target wake time (TWT) setup request message. The TWT setup request message may include information related to whether the first STA supports TWT operation in multi-link.

The processor may be configured to receive, from the second STA, a TWT setup response message, in response to the TWT setup request message. The TWT setup response message may include information related to a link on which the TWT operation is performed in the first STA. The processor may be configured to determine the operating state of the first STA based on the TWT setup response message.

The technical features of the present specification may be implemented based on a computer readable medium (CRM). For example, the CRM proposed by the present specification may store instructions to perform operations which include transmitting, to a second STA, a target wake time (TWT) setup request message. The TWT setup request message may include information related to whether the first STA supports TWT operation in multi-link. The operations may include receiving, from the second STA, a TWT setup response message in response to the TWT setup request message. The TWT setup response message may include information related to a link on which the TWT operation is performed by the first STA. The operations may include determining an operation state of the first STA based on the TWT setup response message. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a first station (STA) in a wireless local area network (WLAN) system, the method comprising:
   transmitting, to a second STA, a target wake time (TWT) setup request message,
   wherein the TWT setup request message includes information related to whether the first STA supports TWT operation in a multi-link;
   receiving, from the second STA, a TWT setup response message, in response to the TWT setup request message,
   wherein the TWT setup response message includes information related to a link on which the TWT operation is performed by the first STA;
   determining an operating state of the first STA based on the TWT setup response message;
   transmitting, to the second STA, a control frame in response to the TWT setup response message;
   after receiving, from the second STA, an ACK frame for the control frame, changing a first link included in the multi-link to a doze state; and
   changing the first link from the doze state to an awake state based on the TWT setup response message.

2. The method of claim 1, wherein the TWT setup request message includes information related to a link in which the first STA supports the TWT operation.

3. The method of claim 1, wherein the TWT setup response message includes information related to a TWT Service Period (SP) for the first STA,
   wherein the TWT SP is a time interval during which the first STA maintains an awake state.

4. The method of claim 1, wherein the TWT setup request message and the TWT setup response message are transmitted and received through the same link.

5. The method of claim 1, wherein the method further comprises,
   receiving information related to a TWT Service Period (SP) for a second link included in the multi-link after changing the first link to an awake state.

6. The method of claim 1, wherein the multi-link includes a first link and a second link,
   wherein the first link and the second link are included in any one of a 2.4 GHz band, a 5 GHz band, or a 6 GHz band.

7. A first station (STA) in a wireless local area network (WLAN) system, the first STA comprising:
   a transceiver to transmit and receive radio signals; and
   a processor to control the transceiver,
   wherein the processor is configured to:
   transmit, to a second STA, a target wake time (TWT) setup request message,
   wherein the TWT setup request message includes information related to whether the first STA supports TWT operation in a multi-link;
   receive, from the second STA, a TWT setup response message, in response to the TWT setup request message,
   wherein the TWT setup response message includes information related to a link on which the TWT operation is performed by the first STA;
   determine an operating state of the first STA based on the TWT setup response message;

transmit, to the second STA, a control frame in response to the TWT setup response message;

after receiving, from the second STA, an ACK frame for the control frame, change a first link included in the multi-link to a doze state; and change the first link from the doze state to an awake state based on the TWT setup response message.

8. The first STA of claim 7, wherein the TWT setup request message includes information related to a link in which the first STA supports the TWT operation.

9. The first STA of claim 7, wherein the TWT setup response message includes information related to a TWT Service Period (SP) for the first STA, wherein the TWT SP is a time interval during which the first STA maintains an awake state.

10. The first STA of claim 7, wherein the TWT setup request message and the TWT setup response message are transmitted and received through the same link.

11. The first STA of claim 7, wherein the processor is further configured to, receive information related to a TWT Service Period (SP) for a second link included in the multi-link after changing the first link to an awake state.

12. The first STA of claim 7, wherein the multi-link includes a first link and a second link, wherein the first link and the second link are included in any one of a 2.4 GHz band, a 5 GHz band, or a 6 GHz band.

* * * * *